(12) United States Patent
Kudo et al.

(10) Patent No.: US 8,518,570 B2
(45) Date of Patent: Aug. 27, 2013

(54) BATTERY SYSTEM

(75) Inventors: Akihiko Kudo, Hitachinaka (JP);
Gosuke Shibahara, Chiba (JP);
Mutsumi Kikuchi, Mito (JP); Satoru Shigeta, Hitachinaka (JP)

(73) Assignees: Hitachi, Ltd., Tokyo (JP); Hitachi Vehicle Energy, Ltd., Hitachinaka-shi (JP)

( * ) Notice: Subject to any disclaimer, the term of this patent is extended or adjusted under 35 U.S.C. 154(b) by 638 days.

(21) Appl. No.: 12/705,305

(22) Filed: Feb. 12, 2010

(65) Prior Publication Data
US 2010/0209748 A1    Aug. 19, 2010

(30) Foreign Application Priority Data
Feb. 17, 2009    (JP) .................................. 2009-034020

(51) Int. Cl.
*H02J 7/00*    (2006.01)
(52) U.S. Cl.
USPC ................ 429/91; 429/92; 320/116; 320/117
(58) Field of Classification Search
USPC .......... 429/91, 92, 160; 340/636.1; 320/116, 320/117
See application file for complete search history.

(56) References Cited

U.S. PATENT DOCUMENTS

| | | | | |
|---|---|---|---|---|
| 4,881,026 A * | 11/1989 | Ishida et al. | .................. | 324/71.1 |
| 5,057,383 A * | 10/1991 | Sokira | .............................. | 429/92 |
| 5,204,608 A * | 4/1993 | Koenck | .......................... | 320/112 |
| 5,372,898 A * | 12/1994 | Atwater et al. | .................. | 429/90 |
| 5,496,657 A * | 3/1996 | Dixon, Jr. | ........................ | 429/62 |
| 5,537,042 A * | 7/1996 | Beutler et al. | ................. | 324/432 |
| 5,640,150 A * | 6/1997 | Atwater | .................... | 340/636.13 |
| 5,641,587 A * | 6/1997 | Mitchell et al. | .................. | 429/90 |
| 5,710,501 A * | 1/1998 | van Phuoc et al. | ............. | 307/150 |
| 6,835,491 B2 * | 12/2004 | Gartstein et al. | ................. | 429/92 |
| 7,420,295 B2 * | 9/2008 | Omae et al. | ...................... | 307/66 |
| 7,898,814 B2 | 3/2011 | Jang | | |
| 8,103,401 B2 * | 1/2012 | Kubo et al. | ................... | 701/34.1 |
| 2002/0172857 A1 * | 11/2002 | Sakurai | ........................... | 429/61 |

(Continued)

FOREIGN PATENT DOCUMENTS

| | | |
|---|---|---|
| JP | 11-183289 A | 7/1999 |
| JP | 2003-151794 A | 5/2003 |

(Continued)

OTHER PUBLICATIONS

U.S. Appl. No. 12/495,038, filed, Jun. 30, 2009.
Japanese Office Action dated Apr. 30, 2013 w/ English translation (eight (8) pages).

*Primary Examiner* — Yogendra Gupta
*Assistant Examiner* — Emmanuel S Luk
(74) *Attorney, Agent, or Firm* — Crowell & Moring LLP

(57) ABSTRACT

A battery system includes: a battery unit formed by electrically connected in series a plurality of cell groups each made up with a plurality of battery cells electrically connected in series; a plurality of sensing lines for detecting voltages of respective battery cells in the battery unit; an integrated circuit provided to each of the cell group, to which the sensing lines for detecting voltages of respective battery cells in the cell group are connected; a case having housed therein a substrate at which a plurality of integrated circuits provided for the cell groups respectively are mounted; noise protection capacitors disposed between input terminals of the plurality of sensing lines; and at least one protection element against static electricity which is connected between the input terminals and the case.

13 Claims, 27 Drawing Sheets

(56) References Cited

U.S. PATENT DOCUMENTS

| | | | |
|---|---|---|---|
| 2008/0238370 A1* | 10/2008 | Carrier et al. | 320/134 |
| 2008/0284375 A1* | 11/2008 | Nagaoka et al. | 320/116 |
| 2009/0087722 A1* | 4/2009 | Sakabe et al. | 429/61 |
| 2009/0130541 A1* | 5/2009 | Emori et al. | 429/61 |
| 2009/0198399 A1* | 8/2009 | Kubo et al. | 701/22 |
| 2009/0208818 A1* | 8/2009 | Poff | 429/50 |
| 2010/0055543 A1* | 3/2010 | Tae et al. | 429/50 |
| 2010/0167110 A1* | 7/2010 | Johnson et al. | 429/91 |
| 2011/0244283 A1* | 10/2011 | Seto et al. | 429/91 |

FOREIGN PATENT DOCUMENTS

| | | |
|---|---|---|
| JP | 2005-318751 A | 11/2005 |
| JP | 2007-85847 A | 4/2007 |
| JP | 2007-311467 A | 11/2007 |
| JP | 2008-289234 A | 11/2008 |
| JP | 2009-27839 A | 2/2009 |
| JP | 2009-89486 A | 4/2009 |
| JP | 2009-89487 A | 4/2009 |
| JP | 2009-89488 A | 4/2009 |
| JP | 2009-183025 A | 8/2009 |

* cited by examiner

FIG.7

CELL VOLTAGE (V) — IN NORMAL OPERATING STATE

| | VOLTAGE AT VARIOUS POINTS (V) | | | |
|---|---|---|---|---|
| | Q3Vgs | CV6-GND | CV5-CV6 | CV4-CV5 |
| 2 | 3.986 | 2 | 2 | 2 |
| 3.6 | 7.19 | 3.6 | 3.6 | 3.6 |
| 4.5 | 8.99 | 4.5 | 4.5 | 4.5 |

CELL VOLTAGE (V) — IN THE EVENT OF DISCONNECTION

| | VOLTAGE AT VARIOUS POINTS (V) | | | |
|---|---|---|---|---|
| | Q3Vgs | CV6-GND | CV5-CV6 | CV4-CV5 |
| 2 | 0 | 1.583 | 0.392 | 2 |
| 3.6 | 0 | 3.183 | 0.392 | 3.6 |
| 4.5 | 0 | 4.083 | 0.392 | 4.5 |

FIG.9

IN NORMAL OPERATING STATE

| CELL DARK CURRENT (µA) = DARK CURRENT INCREASE | | | |
|---|---|---|---|
| BC6 (LOWEST ORDER) | BC5 | BC4 | BC3 |
| 2.75 | 3.97 | 3.07 | 0 |
| 5.42 | 7.24 | 5.61 | 0 |
| 6.93 | 9.08 | 7.04 | 0 |

IN THE EVENT OF DISCONNECTION

| CELL DARK CURRENT (µA) → INCREASE IN DARK CURRENT | | | |
|---|---|---|---|
| BC6 (LOWEST ORDER) | BC5 | BC4 | BC3 |
| 0 | 0 | 0 | 0 |
| 0 | 0 | 0 | 0 |
| 0 | 0 | 0 | 0 |

BATTERY SYSTEM

INCORPORATION BY REFERENCE

The disclosure of the following priority application is herein incorporated by reference: Japanese Patent Application No. 2009-004724 filed Jan. 13, 2009

BACKGROUND OF THE INVENTION

1. Field of the Invention

The present invention relates to a battery system for secondary batteries.

2. Description of the Related Art

A battery system in the related art includes a plurality of battery groups, each formed by connecting in series a plurality of battery cells, connected so as to constitute a battery module, and a lower-order control device that monitors the states of the battery cells, installed in correspondence to each battery group. Such a battery system in the known art may execute diagnosis to determine whether a battery cell is in an overcharged state or an over-discharged state (see, for instance, Japanese Laid Open Patent Publication No. 2005-318751). The battery system may be further equipped with a function of diagnosing the operating state of a balancing circuit installed to minimize differences in the level of charge among individual battery cells.

SUMMARY OF THE INVENTION

While the battery system needs to monitor the states of the battery cells by adjusting the levels of charge via the balancing circuit and performing diagnosis for overcharge or over discharge as described above, it is also required to assure improved reliability of the battery system as a whole by, for instance, improving the reliability of the measuring system in addition to monitoring the states of the battery cells. An object of the present invention is to provide a battery system assuring better reliability.

According to the 1st aspect of the present invention, a battery system comprises: a battery unit formed by electrically connected in series a plurality of cell groups each made up with a plurality of battery cells electrically connected in series; a plurality of sensing lines for detecting voltages of respective battery cells in the battery unit; an integrated circuit provided to each of the cell group, to which the sensing lines for detecting voltages of respective battery cells in the cell group are connected; a case having housed therein a substrate at which a plurality of integrated circuits provided for the cell groups respectively are mounted; noise protection capacitors disposed between input terminals of the plurality of sensing lines; and at least one protection element against static electricity which is connected between the input terminals and the case.

According to the 2nd aspect of the present invention, in the battery system according to the 1st aspect, it is preferred that the integrated circuit includes an internal diode disposed between a pair of connector terminals to which a pair of sensing lines for detecting a voltage at a lowest-order battery cell in the battery unit are connected; a disconnection countermeasure diode is connected outside an integrated circuit between the pair of connector terminals; and the disconnection countermeasure diode is connected so that an amount of voltage drop as a predetermined current is supplied along a forward direction is less than an amount of voltage drop of the internal diode and that an orientation of forward direction relative to the pair of connector terminals is same as an orientation of the internal diode.

According to the 3rd aspect of the present invention, in the battery system according to the second aspect, it is preferred that the integrated circuit comprises a constant voltage source to which a voltage at a connector terminal connected to a positive pole-side of the lowest-order battery cell is applied as a bias voltage; and a pull-up circuit that pulls up a potential at the connector terminal is provided so as to achieve a positive voltage at the connector terminal against ground of the integrated circuit when a lowest-order sensing line among the plurality of sensing lines is disconnected.

According to the 4th aspect of the present invention, in the battery system according to the 3rd aspect, it is preferred that the dark current adjustment resistors are disposed between the input terminals in order to minimize variance among dark currents of respective battery cells attributable to providing the pull up circuit.

According to the 5th aspect of the present invention, in the battery system according to the 1st aspect, it is preferred that a circuit member that indicates whether or not an abnormal current has flowed through the sensing lines is provided at a surface layer of a substrate upon which the plurality of integrated circuits are mounted so as to assume a position between cell voltage input circuits provided on an input side of the plurality of integrated circuits and the input terminals.

According to the 6th aspect of the present invention, in the battery system according to the 5th aspect, it is preferred that the circuit member constitutes part of a circuit pattern formed at a substrate surface layer between the input terminals and the cell voltage input circuits, and the pattern is broken with a fusing current smaller than a fusing current for the sensing lines.

According to the 7th aspect of the present invention, in the battery system according to the 1st aspect, it is preferred that the battery system further comprises: bypass lines each provided with a bypass resistor, which connect the input terminals with bypass terminals located at the integrated circuit; balancing switches provided within the integrated circuit between the bypass terminals and the connector terminals, which adjust variance among charge amounts of the battery cells by supplying a discharge current via the bypass line; and resistors provided at input lines extending between the input terminals and the connector terminals, wherein: noise suppression capacitors are connected between input lines located further toward the input terminals relative to the resistors and the bypass lines.

According to the 8th aspect of the present invention, in the battery system according to the 7th aspect, it is preferred that the bypass resistor is split into two resistors, with one of the two resistors provided at a bypass line further toward the input terminals relative to a connecting point at which the noise suppression capacitor is connected and another of the two resistors provided at the bypass line further toward the bypass terminal relative to the connecting point.

According to the 9th aspect of the present invention, a battery system comprises: a battery unit formed by electrically connected in series a plurality of cell groups each made up with a plurality of battery cells electrically connected in series; a plurality of sensing lines for detecting voltages of respective battery cells in the battery unit; an integrated circuit provided to each of the cell group, to which the sensing lines for detecting the voltages of respective battery cells in the cell group are connected; a case having housed therein a substrate at which a plurality of integrated circuits provided for the cell groups respectively are mounted, wherein: the integrated circuit includes an internal diode provided between a pair of connector terminals to which a pair of sensing lines for detecting a voltage at a lowest-order battery cell in the battery unit are connected; a disconnection countermeasure diode is connected outside an integrated circuit between the pair of connector terminals; and the disconnection countermeasure diode is connected so that a voltage drop as a predetermined current is supplied along a forward direction is less than a voltage drop of the internal diode and that an orientation of forward direction relative to the pair of connector terminals is same as an orientation of the internal diode.

According to the 10th aspect of the present invention, in the battery system according to the 9th aspect, it is preferred that the integrated circuit comprises a constant voltage source to which a voltage at a connector terminal connected to a positive pole-side of the lowest-order battery cell is applied as a bias voltage; and a pull-up circuit that pulls up a potential at the connector terminal is provided so as to achieve a positive voltage at the connector terminal against ground of the integrated circuit when a lowest-order sensing line among the plurality of sensing lines is disconnected.

According to the 11th aspect of the present invention, a battery system comprises: a battery unit formed by electrically connected in series a plurality of cell groups each made up with a plurality of battery cells electrically connected in series; a plurality of sensing lines for detecting voltages of respective battery cells in the battery unit; an integrated circuit provided to each of the cell group to which the sensing lines for detecting voltages of respective battery cells in the cell group are connected; and a circuit member that indicates whether or not an abnormal current has flowed through the sensing lines, provided at a surface layer of the substrate upon which the plurality of integrated circuits are mounted so as to assume a position between cell voltage input circuits provided on an input side of the plurality of integrated circuits and the input terminals.

According to the 12th aspect of the present invention, a battery system comprises: a battery unit formed by electrically connected in series a plurality of cell groups each made up with a plurality of battery cells electrically connected in series; a plurality of sensing lines for detecting voltages of respective battery cells in the battery unit; an integrated circuit provided to each of the cell group to which the sensing lines for detecting voltages of respective battery cells in the cell group are connected; bypass lines each provided with a bypass resistor, which connect the input terminals with bypass terminals provided at the integrated circuit; balancing switches provided within the integrated circuit between the bypass terminals and the connector terminals, which adjust variance among charge amounts of the battery cells by supplying a discharge current via the bypass line; and resistors provided at input lines extending between the input terminals and the connector terminals, wherein: noise suppression capacitors are connected between input lines located further toward the input terminals relative to the resistors and the bypass lines.

According to the 13th aspect of the present invention, in the battery system according to the 12th aspect, it is preferred that the bypass resistor is split into two resistors, with one of the two split resistors provided at a bypass line further toward the input terminals relative to a connecting point at which the noise suppression capacitor is connected and another of the two split resistors provided at the bypass line further toward the bypass terminal relative to the connecting point.

According to the present invention, a battery system assuring improved reliability is provided.

BRIEF DESCRIPTION OF THE DRAWINGS

FIG. 7 presents simulation results with regard to the voltages at various points when normal operation is executed without experiencing any disconnection and the voltages at the various points in a disconnected state;

FIG. 9 presents cell dark current simulation results;

DESCRIPTION OF PREFERRED EMBODIMENTS

The following is a description of the preferred embodiments of the present invention given in reference to the drawings.

First Embodiment

Figure 1A:
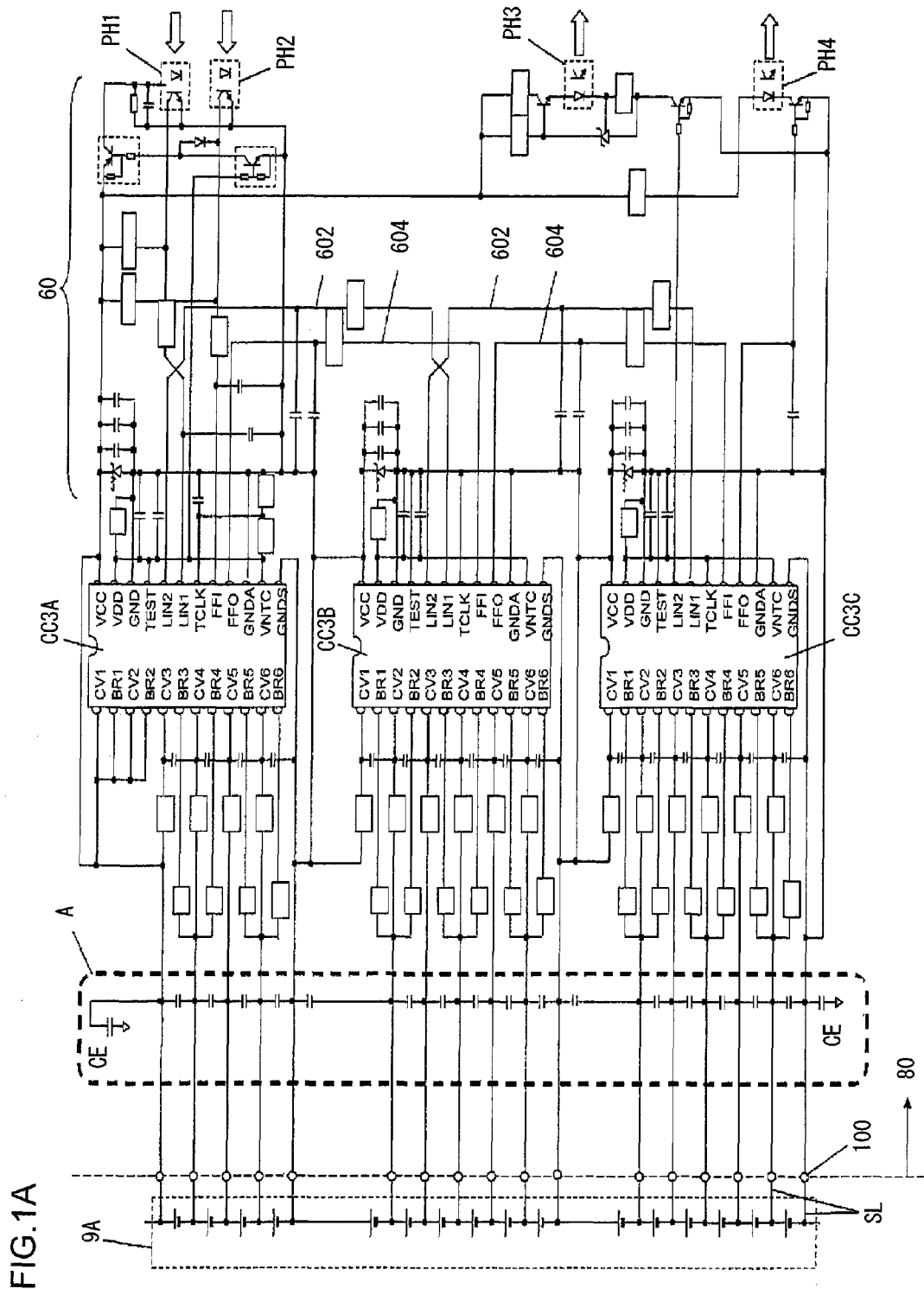
FIG. 1 illustrates a first embodiment of the present invention.
Figure 1B:
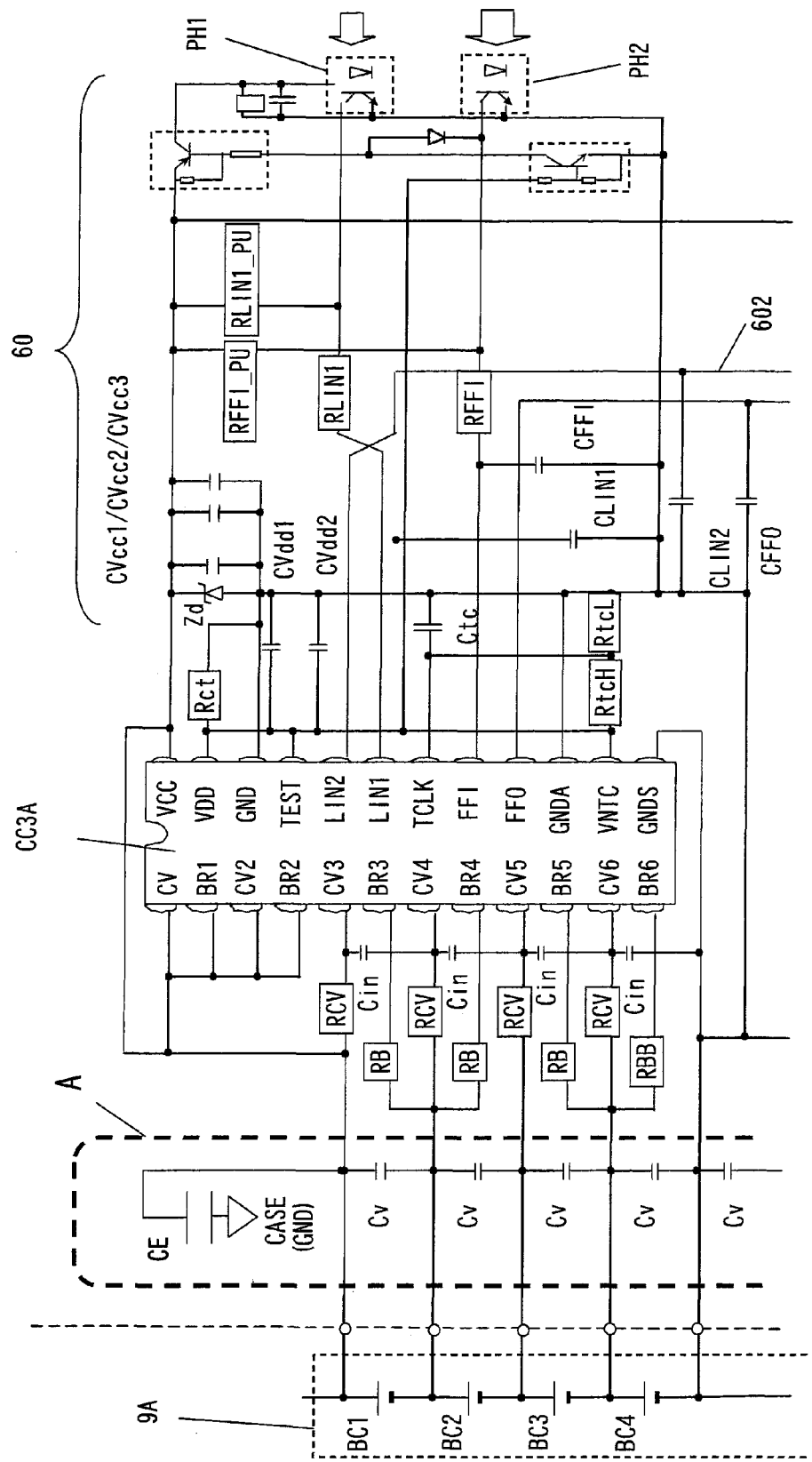
Figure 1C:
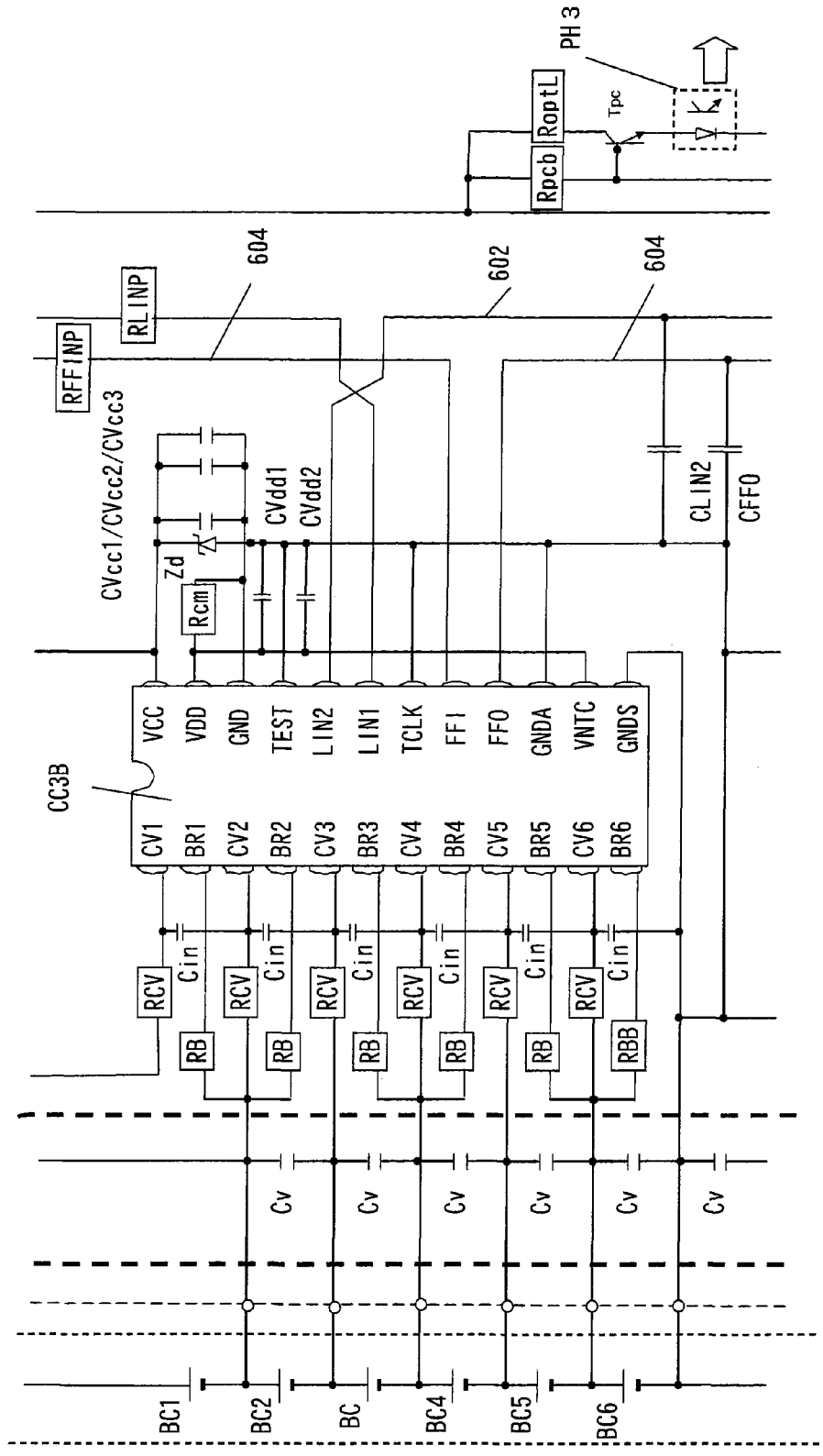
Figure 1D:
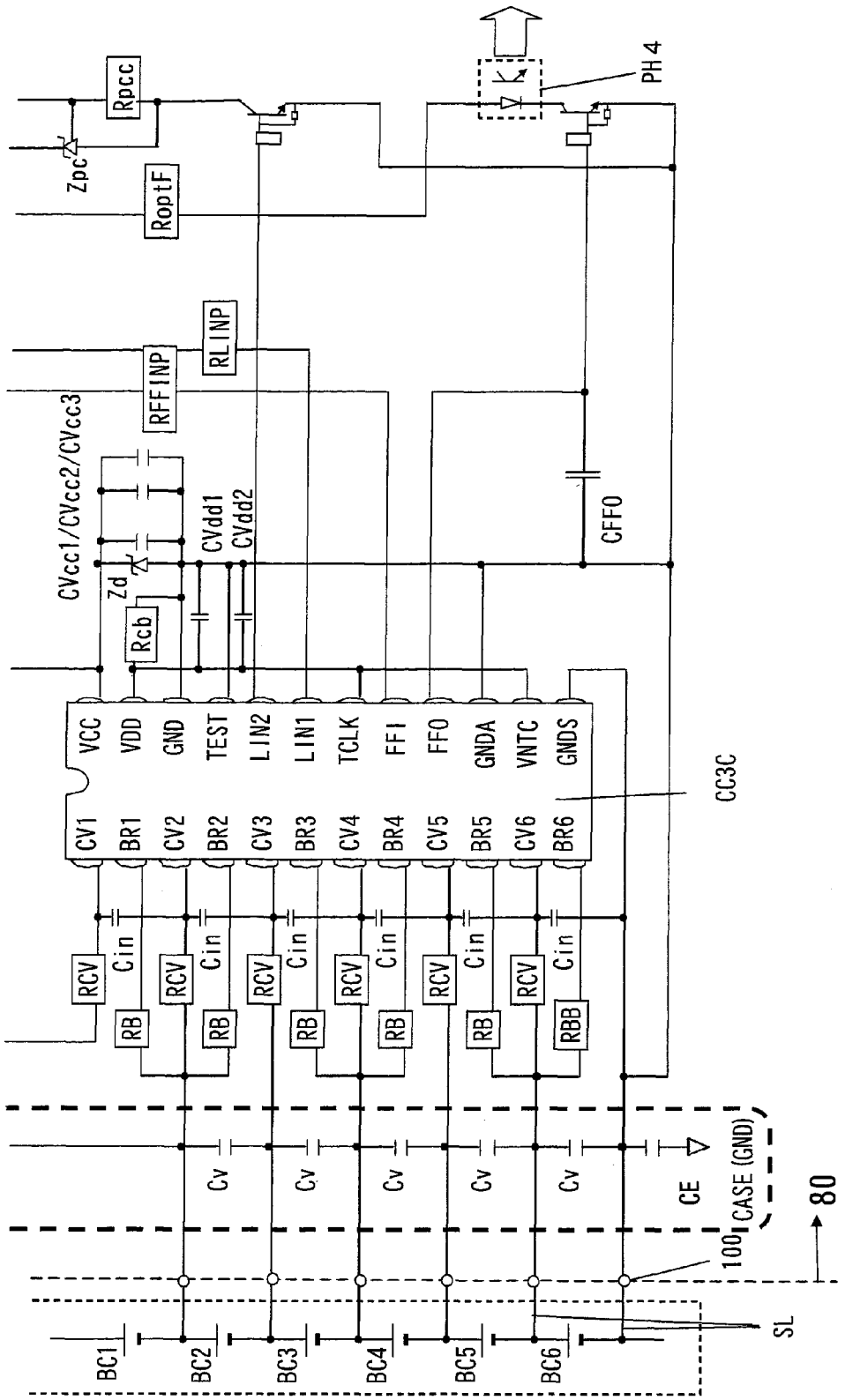
Figure 2:
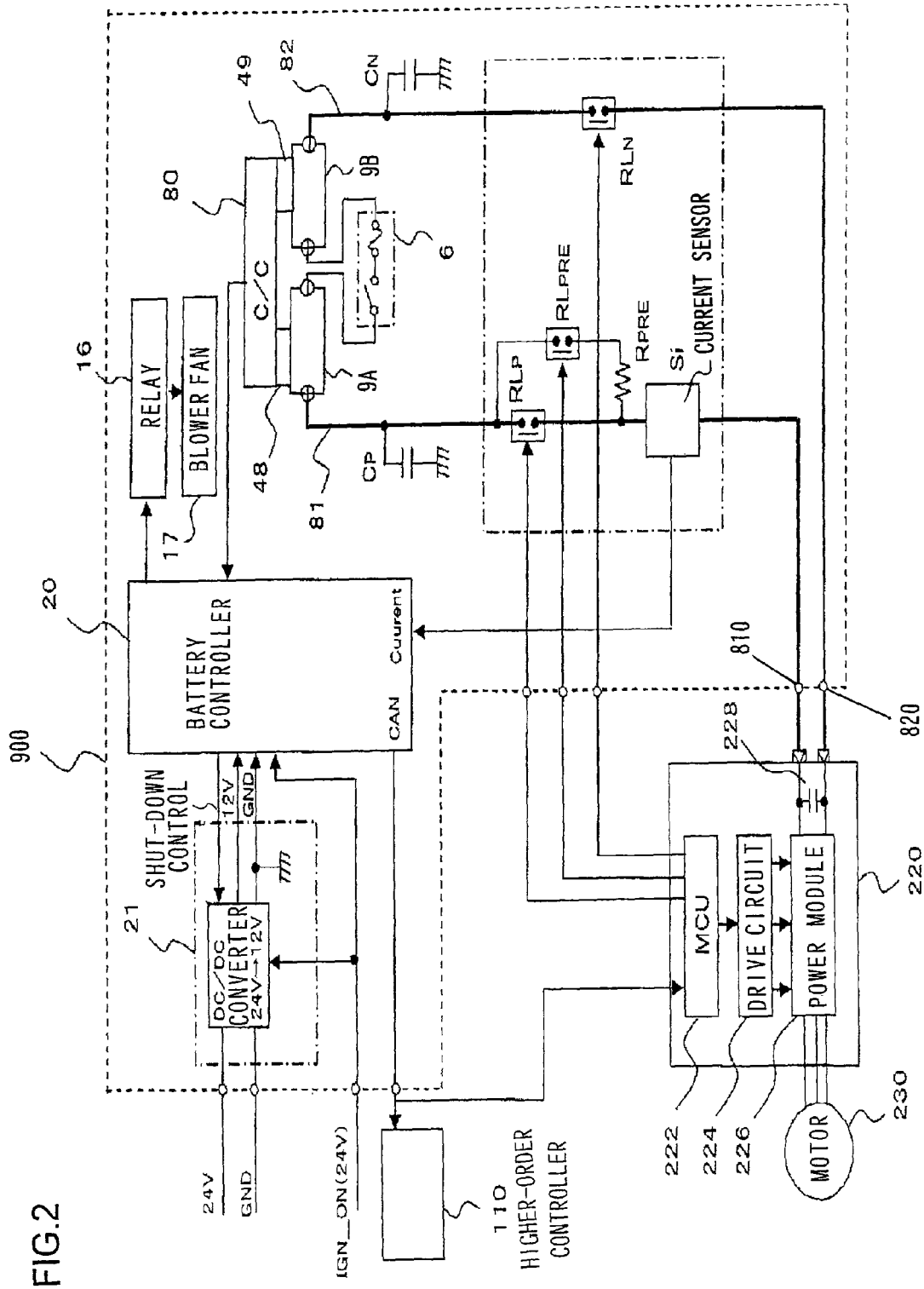
FIG. 2 shows a drive system of a rotating electrical machine for a vehicle.
Figure 3A:
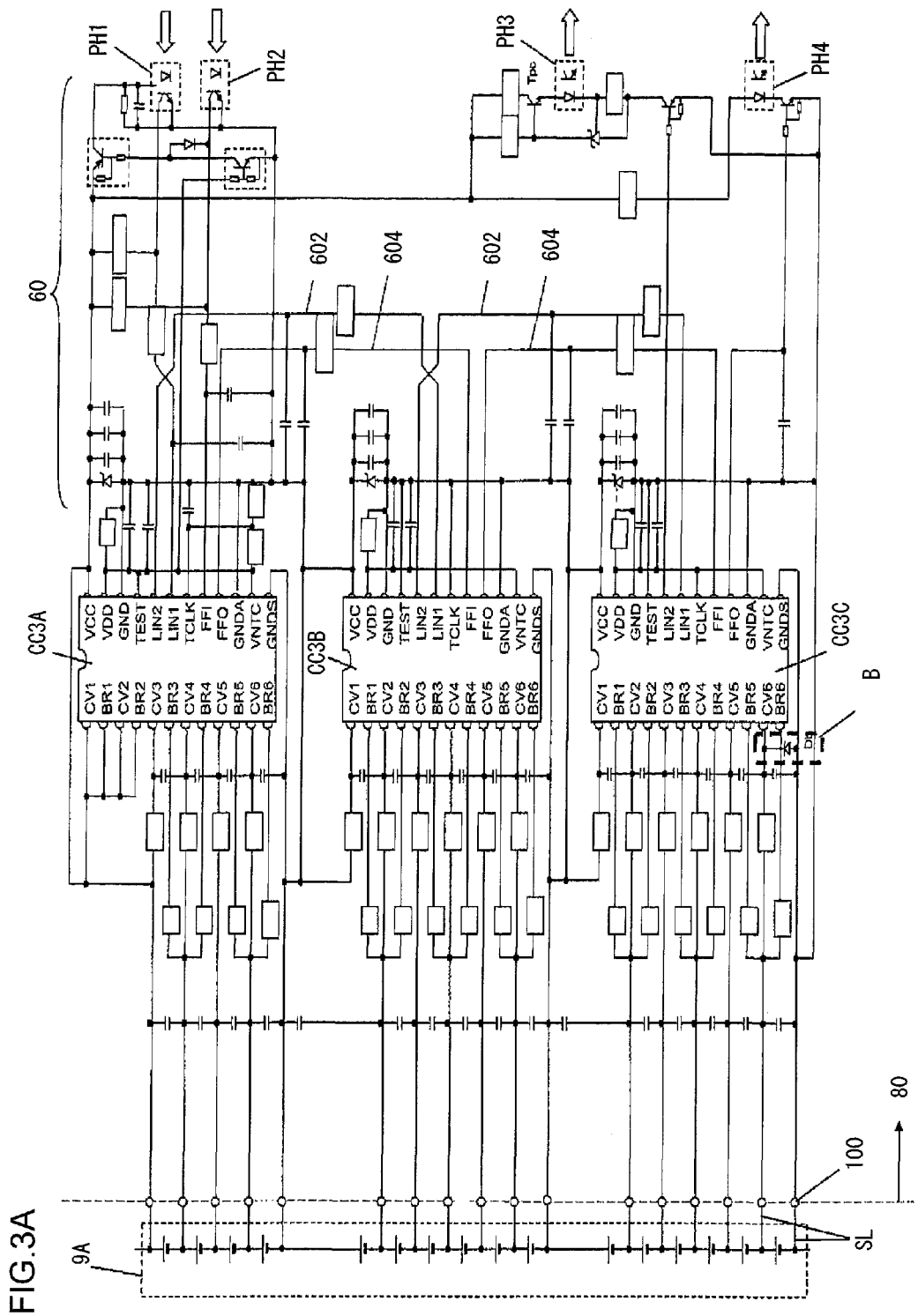
FIG. 3 is a diagram for explaining a second embodiment of the present invention.
Figure 3B:
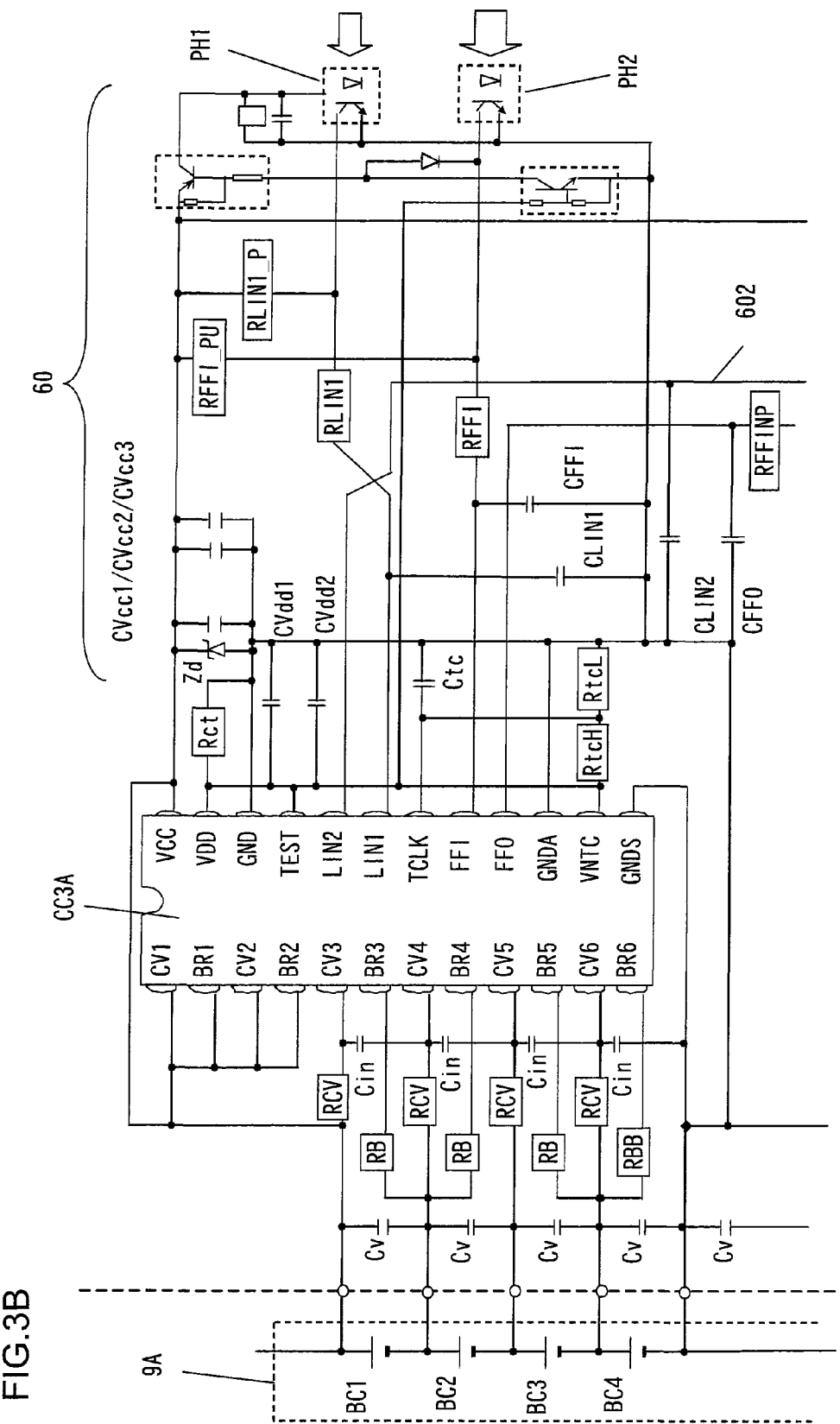
Figure 3C:
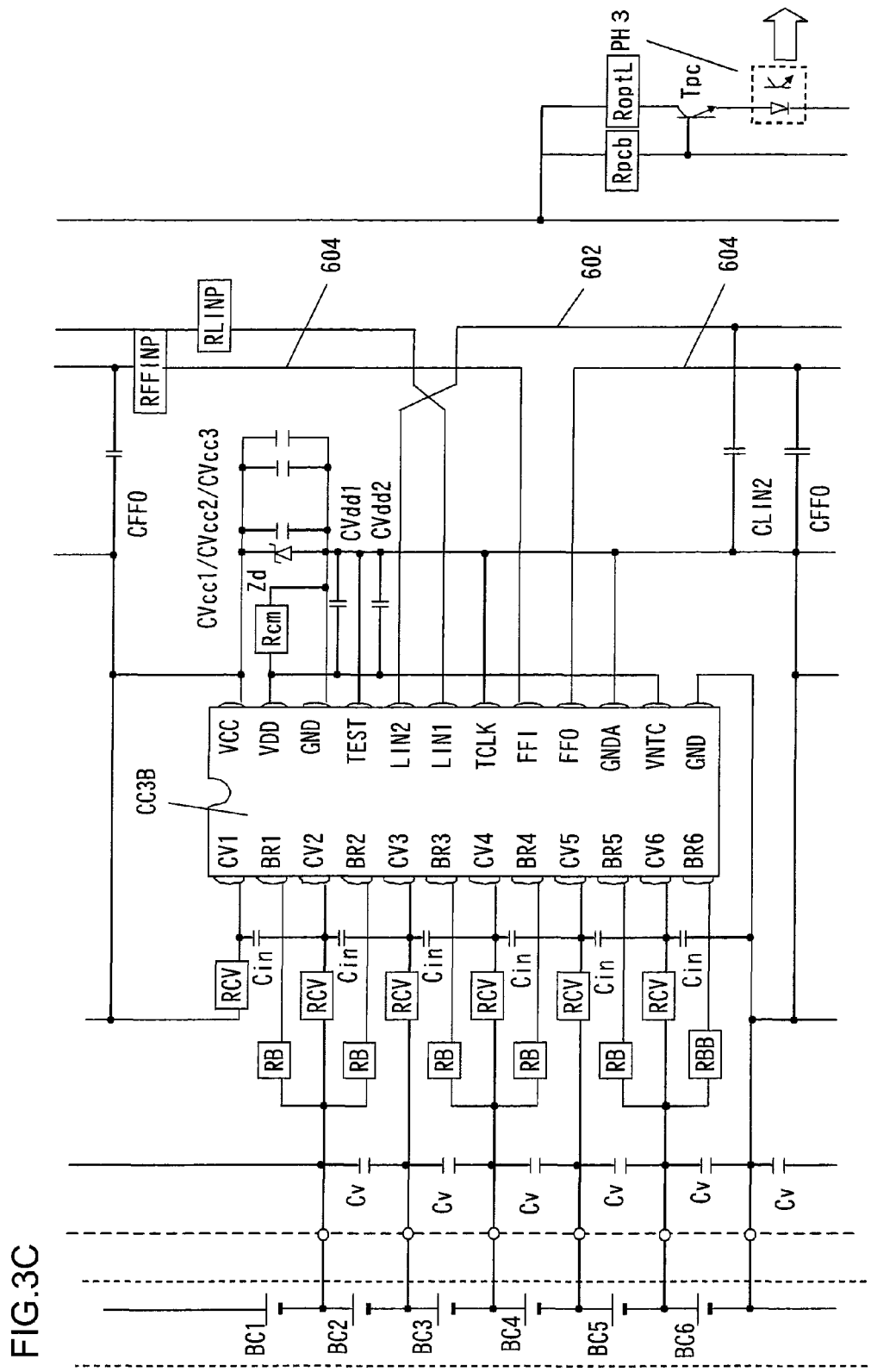
Figure 3D:
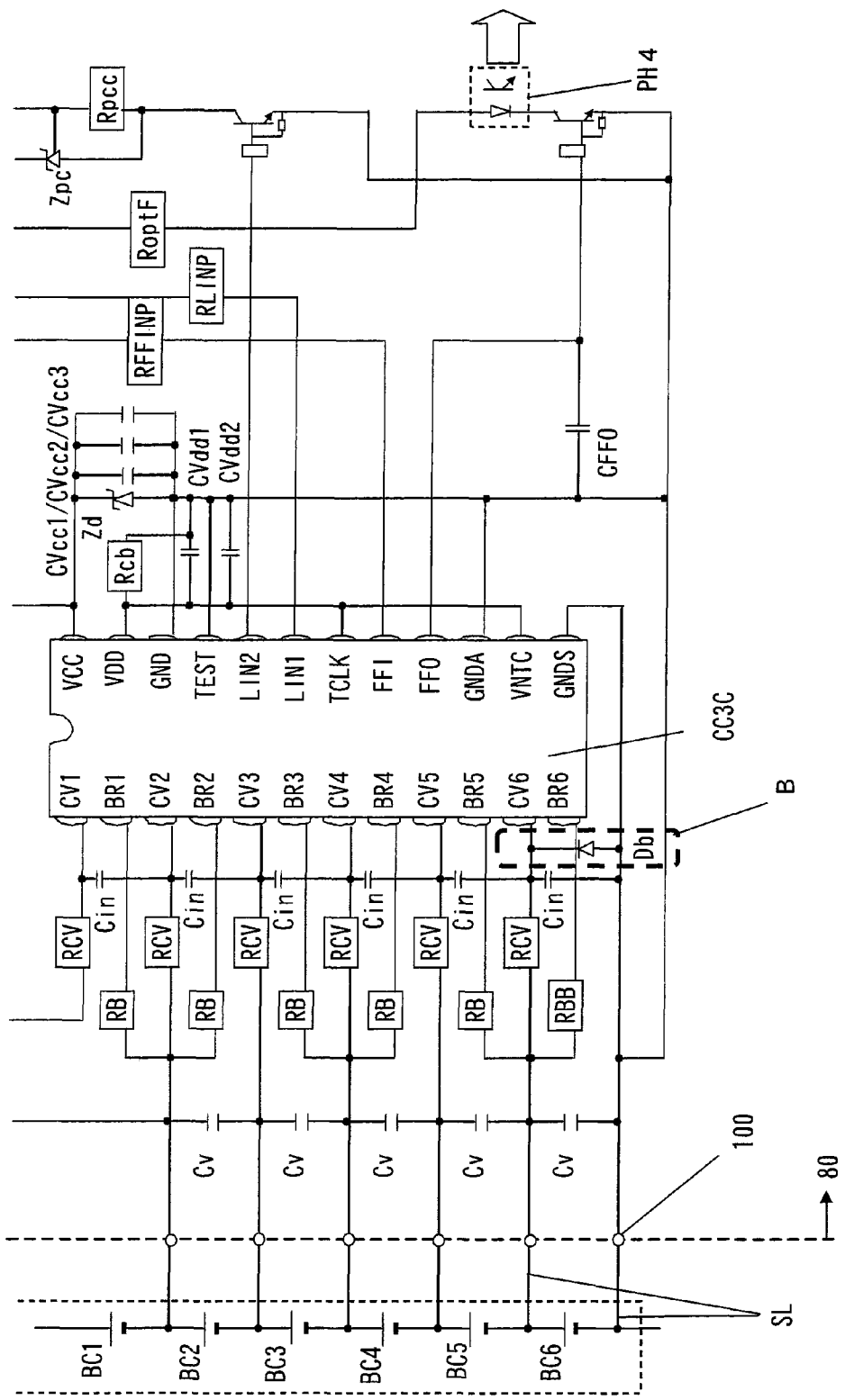

FIG. 1 shows the essential structure of the battery system achieved in the embodiment. FIG. 2 shows a drive system of a rotating electrical machine for a vehicle where the battery system of the present embodiment is mounted in a vehicle. While the battery system should ideally be installed in an automobile, desirable results can also be obtained by applying the present invention to an electric train. While the present invention may also be applied to industrial machines, the following description focuses on an example in which the present invention is applied to a vehicle.

In reference to the first embodiment of the present invention, a measure that may be taken with regard to the ESD (electrostatic discharge) among measures that could be taken to improve the reliability of the battery system, is described. The drive system of a rotating electrical machine for a vehicle shown in FIG. 2 is first described. The drive system in FIG. 2 comprises a battery unit 900 that includes a battery system, and inverter device 220 that converts DC power provided from the battery unit 900 to three-phase AC power, a motor 230 engaged in operation to drive the vehicle and a higher-order controller 110 that controls the battery unit 900 and the inverter device 220. The motor 230 is driven with three-phase AC power provided from the inverter device 220.

The battery unit 900 includes two battery modules 9A and 9B, a cell controller 80 and a battery controller 20. The battery module 9A and the battery module 9B are connected in series via a switcher 6 that includes a switch and a fuse connected to each other in series and functions as a service disconnect at the time of maintenance or inspection. As the switcher 6 opens, the serially connected circuit in the electric circuit becomes cut off and thus, even if a circuit connecting the battery module 9A or 9B with the vehicle is formed somewhere in the battery module 9A or 9B, no current will flow. A high level of safety can be assured by adopting this configuration.

The battery module 9A is constituted by connecting a plurality of battery cell groups each formed with a plurality of battery cells connected in series. The battery module 9B assumes a similar structure. The positive pole of the battery module 9A is connected to the positive pole of the inverter device 220 via a positive pole, high-power cable 81 and a relay RLP. The negative pole of the battery module 9B is connected to the negative pole of the inverter device 220 via a negative pole, high-power cable 82 and a relay RLN. In addition, a serial circuit constituted with a resistor RPRE and a pre-charge relay RLPRE is connected in parallel to the relay RLP. A current sensor Si constituted with, for instance, a hall element is inserted between the relay RLP and the inverter device 220. The current sensor Si is installed within a junction box, with its output line guided to the battery controller 20.

The relay RLP and the relay RLN may be relays with a rated current of approximately 80 A, whereas the rated current of the pre-charge relay RLPRE may be approximately 10 A. In addition, the resistor RPRE may be a resistor with a rated capacity of 60 W and a resistance value of approximately 50Ω, whereas the rated current of the current sensor Si may be, for instance, approximately ±200 A. The negative pole, high-power cable 82 and the positive pole, high-power cable 81 mentioned earlier are connected to the inverter device 220, which drives the motor 230, via the relays RLP and RLN and output terminals 810 and 820. By adopting such a configuration, a high level of safety can be assured.

The inverter device 220 includes a power module 226, an MCU 222, a driver circuit 224 that drives the power module 226 and a smoothing capacitor 228 with a large capacity of, for instance, 700 μF~2000 μF. The power module 226 converts the DC power provided from the power modules 9A and 9B to three-phase AC power used to drive the motor 230.

More desirable characteristics can be achieved with the smoothing capacitor 228 constituted with a film capacitor rather than an electrolytic capacitor. The smoothing capacitor 228 installed in a vehicle will be affected by the environment in which the vehicle operates. Thus, the smoothing capacitor is likely to be engaged in operation over a wide temperature range from a few tens of degrees below zero degrees Celsius through approximately 100 degrees Celsius. The characteristics of an electrolytic capacitor will rapidly deteriorate once the temperature falls below 0 degrees Celsius and thus, the level of its voltage noise removal performance will be lowered. This means that the integrated circuit in the cell controller 80 may be subjected to significant noise. The characteristics of a film capacitor, on the other hand, are compromised to a lesser extent at low temperatures and thus, the voltage noise affecting the integrated circuit can be more effectively reduced.

When the drive of the motor 230 is to start, the MCU 222 first switches the negative pole-side relay RLN from the open state to the closed state, switches the pre-charge relay RLPRE from the open state to the closed state, thereby charging the smoothing capacitor 228, and subsequently switches the positive pole-side relay RLP from the open state to the closed state so as to start the power supply from the battery modules 9A and 9B in the battery unit 900 to the inverter device 220 by following instructions issued by the higher-order controller 110.

It is to be noted that the inverter device 220 controls the phase of the AC power generated via the power module 226 for the rotor in the motor 230, so as to engage the motor 230 as a generator when applying the brakes on the hybrid vehicle and to charge the battery modules 9A and 9B by regenerating power via the operation of the generator to the battery modules 9A and 9B under regenerative braking control when applying the brakes on the hybrid vehicle. If the levels of charge at the battery modules 9A and 9B indicating the extents to which the battery modules are charged are lower than a reference charge quantity, the inverter device 220 engages the motor 230 in operation as a generator. The three-phase AC power generated at the motor 230 is converted to DC power at the power module 226 and the DC power is then supplied to the power modules 9A and 9B. The power modules 9A and 9B thus become charged.

When engaging the motor 230 in a power running operation, the MCU 222 controls the driver circuit 224 so as to generate a rotating magnetic field along the advancing direction in which the rotor of the motor 230 rotates and thus controls the switching operation at the power module 226 by following instructions issued by the higher-order controller 110. Under these circumstances, the DC power from the battery modules 9A and 9B is supplied to the power module 226. When charging the battery modules 9A and 9B through regenerative braking control, the MCU 222 controls the driver circuit 224 so as to generate a rotating magnetic field along a retarding direction, in which the rotation of the rotor at the motor 230 is retarded, and controls the switching operation at the power module 226 accordingly. In this situation, power is supplied from the motor 230 to the power module 226 and DC power from the power module 226 is supplied to the battery modules 9A and 9B. Consequently, the motor 230 functions as a generator.

The power module 226 in the inverter device 220 executes power conversion to convert DC power to AC power and vice versa as it is engaged in high-speed continuity/discontinuity operation. In this operation, it cuts off a large current at high speed and thus, a significant voltage fluctuation occurs due to the inductance in the DC circuit. The large-capacity smoothing capacitor 228 is installed in the DC circuit in order to minimize the voltage fluctuation. The heat generated in the power module 226 is a serious issue that must be addressed in the on-vehicle inverter device 220, and the speed with which the power module 226 engages in the continuity/discontinuity operation must be increased in order to minimize the heat generation. However, an increase in the operating speed is bound to increase the extent to which the voltage spikes due to the inductance, which, in turn, results in larger noise. This tends to lead to a further increase in the capacity of the smoothing capacitor 228.

At the start of the operation of the inverter device 220, the electrical charge in the smoothing capacitor 228 is substantially 0. However, as the relay RLP is closed, a large initial current flows into the smoothing capacitor 228. The large current may cause the negative pole-side main relay RLN and the positive pole-side main relay RLP to become damaged by fusing. In order to address this concern, the MCU 222, having switched the negative pole-side relay RLN from the open state to the closed state and holding the positive pole-side relay RLP in the open state, switches the pre-charge relay RLPRE from the open state to the closed state to charge the smoothing capacitor 228 while limiting the maximum current via the resister RPRE.

Once the smoothing capacitor 228 has been charged to a predetermined voltage level, the initial state is cleared. Namely, the initial charge of the smoothing capacitor 228 via the pre-charge relay RLPRE and the resistor RPRE is halted, and DC power is supplied from the battery unit 900 to the power module 226 by switching the negative pole-side relay RLN and the positive pole-side relay RLP to the closed state. Through this control, under which the relay circuits are protected and the maximum current to flow through the lithium battery cells and the inverter device 220 can be adjusted to a level equal to or less than a predetermined value, a high level of safety can be assured.

Since the noise voltage can be minimized by reducing the inductance in the DC-side circuit of the inverter device 220, the smoothing capacitor 228 is installed in close proximity to a DC-side terminal at the power module 226. The smoothing capacitor 228 itself also adopts a configuration that helps to reduce the inductance. As the initial charge current is supplied to the smoothing capacitor 228 with such a configuration, a large current briefly flows into the smoothing capacitor, which may generate a great deal of heat to result in damage. However, the risk of such damage can be reduced by limiting the charge current via the pre-charge relay RLPRE and the resistor RPRE as described earlier. While the inverter device 220 is controlled by the MCU 222, the MCU 222 also executes the control under which the smoothing capacitor 228 is initially charged as described above.

At the battery unit 900, a capacitor CN and a capacitor CP are inserted respectively in a connecting line connecting the negative pole of the battery module 9B with the negative pole-side relay RLN and in a connecting line connecting the positive pole of the battery module 9A with the positive pole-side relay RLP, at positions between the connecting lines and the case ground (assuming a potential equal to that at the vehicle chassis). These capacitors CN and CP, which remove noise generated in the inverter device 220, prevent erroneous operation of the low-power circuit and damage attributable to a surge voltage in the integrated circuits constituting the cell controller 80. While the inverter device 220 is equipped with a noise removal filter, the capacitors CN and CP are inserted as additional measures for further improving the noise-withstanding reliability of the battery unit 900 by ensuring more effective prevention of erroneous operation of the battery controller 20 and the cell controller 80.

It is to be noted that the high-power circuit in the battery unit 900 is indicated by the solid line in FIG. 2. The high-power circuit indicated by the solid line is wired by using a flat copper wire with a large sectional area. In addition, a blower fan 17, used to cool the battery modules 9A and 9B, is engaged in operation via a relay 16 which is turned on in response to a command issued by the battery controller 20.

The ESD countermeasure provided through the present embodiment is now described in reference to FIG. 1. FIG. 1 shows the battery module 9A and the part of the cell controller 80 related to the battery module 9A. It is to be noted that a similar structure is adopted in relation to the battery module 9B and that the following explanation focuses on the battery module 9A as a representative example. The battery module 9A is constituted with a plurality of battery cell groups connected in series. The battery module 9A in the example presented in FIG. 1 is constituted with three battery cell groups. While the higher-order battery cell group is made up with four battery cells BC1~BC4 connected in series, the mid-order battery cell group and the lower-order battery cell group are each made up with six battery cells BC1~BC6 connected in series. The cell controller 80 includes battery cell controllers CC3A, CC3B and CC3C installed each in correspondence to one of the battery cell groups. The battery cell controllers CC3A~CC3C are each constituted with an integrated circuit and a circuit board on which the integrated circuits are mounted is housed inside a case (not shown) having a shielding function.

Transmission paths 60, through which signals are received/transmitted, extend between the battery cell controllers CC3A~CC3C and the battery controller 20, which operates as a higher-order control circuit. The individual battery cell controllers CC3A~CC3C are connected in series via transmission paths 602 and 604. The transmission paths 60 include a transmission paths through which command signals issued by the battery controller 20 in FIG. 2 are transmitted and transmission paths through which error signals from the individual battery cell controllers CC3A~CC3C are transmitted.

A command signal originating from the battery controller 20 is input via a photocoupler PH 1 to the transmission path 60 and is then received at a reception terminal LIN1 of the battery cell controller CC3A via the transmission path 60. From a transmission terminal LIN2 of the battery cell controller CC3A, data or a command corresponding to the command signal is transmitted. The command signal received at the reception terminal LIN1 of the battery cell controller CC3B is then transmitted from the transmission terminal LIN2. The transmission target signal received and transmitted in sequence as described above is subsequently transmitted from the transmission terminal LIN2 of the battery cell controller CC3C and is finally received at a reception terminal of the battery controller 20 via a photocoupler PH 3. Serial communication is thus enabled via the loop communication path described above. In response to the command signal having been received, the battery controllers CC3A~CC3C each start terminal voltage detection, diagnosis and the like for the battery cells BC1~BC6 constituting the corresponding battery cell group and data collected or detected at each battery cell controller based upon the command signal are transmitted to the battery controller 20 through the serial communication described above.

Furthermore, the battery cell controllers CC3A~CC3C each execute error diagnosis and transmit a one-bit signal via the transmission path 604 if an error is detected through the diagnosis. The battery cell controllers CC3A~CC3C each transmit an error signal from a transmission terminal FFO thereof upon deciding that an error exists in the particular battery cell controller or upon receiving at a reception terminal FFI thereof a signal (error signal) indicating an error from the battery cell controller at the preceding stage. If the input of an error signal, having been sent to the reception terminal FFI stops or the results of self-diagnosis having thus far indicated an error state, shift to indicate a normal state, the error signal transmitted from the transmission terminal FFO switches to a normal signal.

While the battery controller 20 transmits no error signal to the battery cell controllers CC3A~CC3C under normal circumstances, it transmits to the battery cell controllers CC3A~CC3C a test signal to be used as a simulated error signal in order to execute diagnosis for the error signal transmission path to determine whether or not the error signal transmission path is operating correctly. The test signal, i.e., the simulated error signal, is input to the transmission path 60 via a photocoupler PH 2 and is transmitted to the reception terminal FFI of the battery cell controller CC3A. The battery cell controller CC3A, having received the test signal, transmits the test signal via its transmission terminal FFO to the reception terminal FFI of the next battery cell controller CC3B. The test signal is further transmitted to the subsequent battery cell controller CC3C and is finally transmitted to the reception terminal of the battery controller 20 from the transmission terminal FFO of the battery cell controller CC3C via the transmission path 60 and a photocoupler PH 4.

The battery controller 20 shown in FIG. 2 assumes a ground potential (GND) equal to the potential at the vehicle chassis and is engaged in operation at a low voltage, e.g., 5 V, generated at a 14 V power source. The power source system constituted of the lithium battery cells is electrically insulated from the 14 V power source, and the battery cell controllers CC3A~CC3C in the embodiment each operate on the potential difference between the highest potential and the lowest potential at the corresponding battery cell group, i.e., on the voltage at the corresponding battery cell group. Namely, the relationship among the potentials achieved in the power source system for the battery controller 20 and the relationship among the potentials observed in the power source system for the battery cell controllers CC3A~CC3C are different and thus, the values of the voltage assumed in these power source systems also greatly differ from each other. Accordingly, insulation circuits (the photocouplers PH 1~PH 4), which electrically insulate the battery controller 20 from the battery cell controllers CC3A~CC3C, are installed in the transmission path 60 connecting the battery cell controllers CC3A~CC3C to the battery controller 20, so as to improve the reliability.

The part enclosed by the dotted line A in FIG. 1 is the part providing the ESD countermeasure. The battery cell controllers CC3A~CC3C each include terminals CV1~CV6, to which the terminal voltages at the battery cells BC1~BC6 are respectively input and a terminal GNDS. The terminals CV1~CV6 and GNDS are individually connected to the positive poles and negative poles of the battery cells BC1~BC6 via sensing lines SL. The sensing lines SL are arranged so as to extend between input terminals 100 located on the circuit board side and the positive and negative poles of the individual battery cells BC1~BC6. In addition, a resistor RCV for limiting a shorting current is installed in each of the input lines for the terminals CV1~CV6. Capacitors Cv and Cin are disposed between the input lines as anti-noise measures.

If the input terminals 100 are subjected to static electricity when, for instance, connecting a connector, the battery cell controllers CC3A~CC3C may become damaged. Accordingly, capacitors CE to function as ESD countermeasure elements are provided between input terminals 100 and a case housing the circuit board. While 16 battery cells are connected in series and the sensing lines SL are connected to the positive poles and the negative poles of the individual battery cells in the battery module 9A shown in FIG. 1, a capacitor EC providing ESD countermeasure is installed at the input terminal 100 to which the highest-order sensing lines SL is connected and another capacitor CE for ESD countermeasure is installed at the input terminal 100 to which the lowest-order sensing lines SL is connected.

In addition, terminal capacitors Cv providing noise protection are installed in parallel to the individual battery cells between the input terminals 100. In the present embodiment, the capacitance of the terminal capacitors Cv is set to a value 100 times that of standard capacitors Cv used for noise protection. For instance, assuming that terminal capacitors Cv normally have a capacitance of 0.001 μF, the terminal capacitors Cv in the present embodiment will have a much greater capacitance of 0.1 μF.

The capacitance of the capacitors CE may be, for instance, 1000 pF 2 kV. The capacitance of the capacitors CE in the present embodiment is set to approximately 10 times the floating capacity between the circuit and the case. By setting the capacitance of the capacitors CE to such a value, it is ensured that the static electricity applied thereto is allowed to be released through the capacitors CE and thus, the applied static electricity is not allowed to flow into the case via the floating capacity.

The static electricity applied to the highest-order sensing lines SL is released to the case ground via the upper capacitor CE, whereas the static electricity applied to the lowest-order sensing line SL is released to the case ground via the lower capacitor CE. Since the terminal capacitors Cv with a capacitance approximately 100 times the capacitance of standard terminal capacitors are installed between the input terminals, static electricity applied to any sensing lines SL other than the highest-order sensing line and the lowest-order sensing line can be released to the highest-order or lowest-order capacitor CE through the terminal capacitors Cv.

By setting the capacitances of the terminal capacitors Cv and the capacitors CE as described above, any static electricity that may be applied to a sensing line SL among the sensing lines SL installed for the 16 cells is not allowed to adversely affect the circuit elements. In addition, by setting the capacitance of the terminal capacitors Cv provided for noise protection to a level approximately 100 times the capacitance of standard terminal capacitors, the number of capacitors CE required for ESD countermeasure can be reduced and, as a result, the installation space can be kept down and production costs can be minimized.

It is to be noted that while the 16-cell battery module 9A constituted with three battery cell groups, i.e., a four-cell battery cell group, a six-cell battery cell group and a six-cell battery cell group, connected in series as shown in FIG. 1 is not adversely affected by static electricity that may be applied thereto because of the capacitors CE installed at the input terminals 100 to which the highest-order sensing line SL and the lowest-order sensing line SL are connected, this structure simply represents an example and a different quantity of capacitors CE may be installed at different input terminals 100 depending upon the number of cells that are connected in series. For instance, in a battery module constituted with two six-cell battery cell groups connected in series, a capacitor CE may be installed at the input terminal 100 to which either the lowest-order sensing line SL in the higher-order battery cell group or the highest-order sensing line SL in the lower-order battery cell group is connected. Alternatively, a capacitor CE may be installed at the input terminal 100 to which the lowest-order sensing line SL in each battery cell group is connected. In such a case, the quantity of the installed capacitors CE will be N−1 with N representing the number of battery cell controllers. In short, the quantity of capacitors CE and the positions at which the capacitors CE are connected should be determined so as to minimize the adverse effects of static electricity application for all the input terminals 100.

It will be obvious that an ESD countermeasure element (capacitor CE) may be installed at each input terminal 100. In such a case, the capacitance of the terminal capacitors Cv does not need to be adjusted to a level approximately 100 times the capacitance of standard terminal capacitors. In addition, even in a configuration with a plurality of capacitors CE each installed at a specific input terminal 100 among the plurality of input terminals 100, the capacitors CE do not need to be installed between battery cell groups. For instance, if a battery cell group includes numerous battery cells, a capacitor CE may be installed at the input terminal 100 connected to a sensing line located in the middle of the battery cell group, so as to allow the static electricity to be released readily to the case.

It is to be noted that ESD countermeasure elements constituted with Zener diodes, varistors or the like, instead of capacitors CE, may be used. However, the issue of a leak current at the circuit elements needs to be taken into consideration when the ESD countermeasure elements are installed at input terminals 100 to which sensing lines SL are connected as in the embodiment. Even a slight leak current of a few μ amperes will lower the voltages at the battery cells and for this reason, capacitors that do not pose such a concern are optimal for use as ESD countermeasure elements.

Second Embodiment

The second embodiment of the present invention includes an additional structural feature indicated by B in FIG. 3 as a measure for improving the reliability. The reliability is improved through the second embodiment by providing an effective countermeasure against disconnection of the lowest-order sensing line SL in the battery module.

Figure 4:
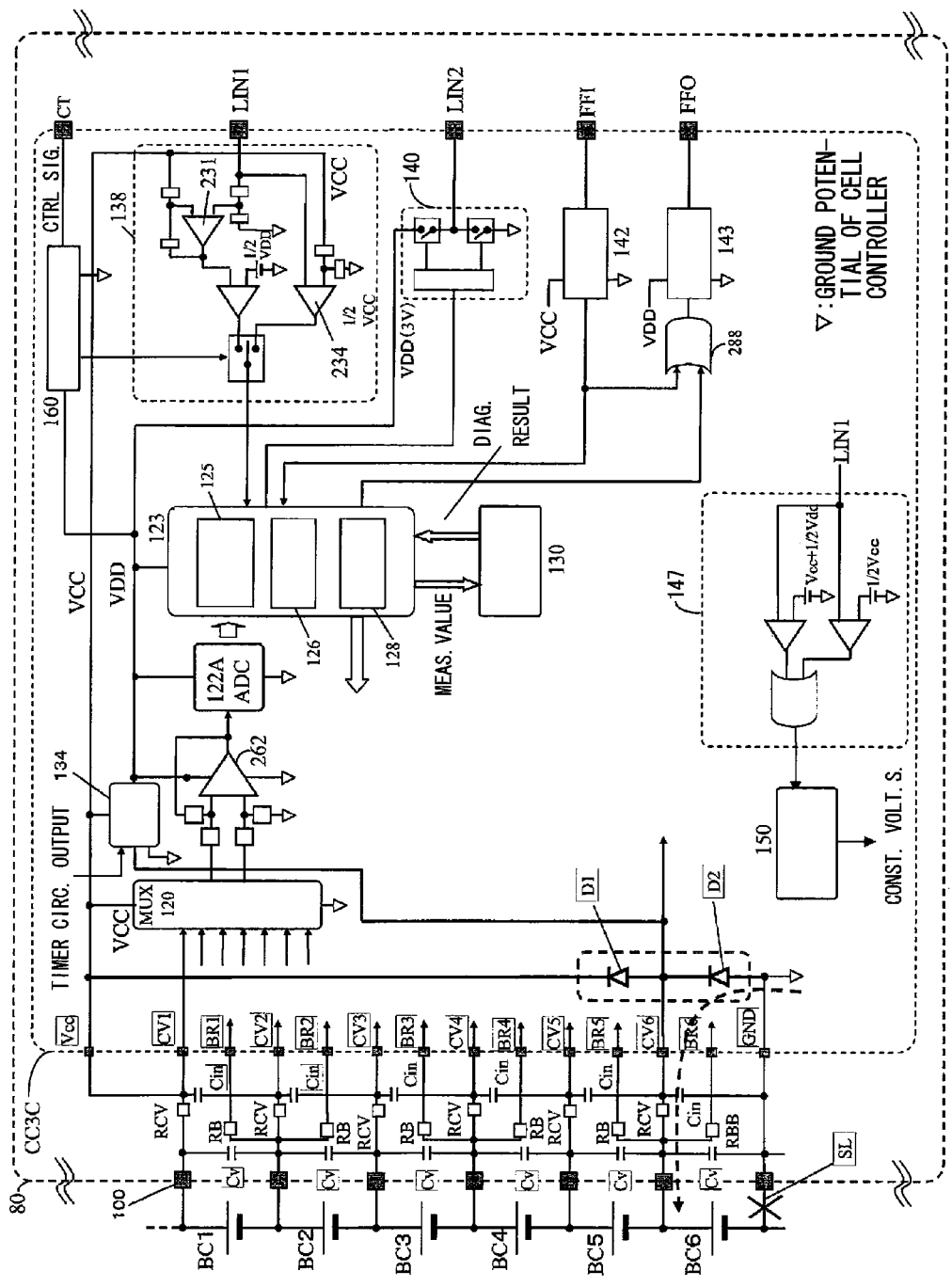
FIG. 4 is a diagram for explaining a problem that may exist before the measure provided through the second embodiment is implemented.

FIG. 4 shows the internal structure of lowest-order battery cell group and the battery cell controller CC3C provided in correspondence to the battery cell group in a state in which the lowest-order sensing line SL is disconnected. The internal structure of the battery cell controller CC3C shown in FIG. 4 only includes essential structural features pertinent to the embodiment. A multiplexer 120, an analog/digital converter 122A, an IC control circuit 123, a diagnosis circuit 130, transmission input circuits 138 and 142, transmission output circuits 140 and 143, a startup input circuit 147, a timer circuit 150, a control signal detection circuit 160, a differential amplifier 262 and an OR circuit 288 are arranged at the battery cell controller CC3C.

The terminal voltages at the battery cells BC1~BC6 are input to the multiplexer 120 via terminals CV1~CV6 and a terminal GND. It is to be noted that the terminal GND is identical to the terminal GNDS in FIG. 1. The multiplexer 120 selects a terminal among the terminals CV1~CV6 and inputs the corresponding between-terminal voltage to the differential amplifier 262. An output from the differential amplifier 262 is converted to a digital value at the analog/digital converter 122A. The between-terminal voltage having been converted to the digital value is provided to the IC control circuit 123 where it is held in an internal data holding circuit 125. Such voltage values are used for diagnostic purposes or are transmitted to the battery controller 20 shown in FIG. 1. The terminal voltages at the individual battery cells BC1~BC6 input to the terminals CV1~CV6 are biased by the electrical potentials determined based upon the terminal voltages at the battery cells connected in series to the ground potential at the battery cell controller CC3C constituted with an integrated circuit. The influence of the biasing potentials is eliminated at the differential amplifier 262 and analog values indicating the terminal voltages at the battery cells BC1~BC6 are input to the analog/digital converter 122A.

The IC control circuit 123, which is equipped with an arithmetic operation function, includes the data holding circuit 125, a timing control circuit 126 that cyclically detects various voltages and executes diagnosis on battery cell conditions and a diagnosis flag holding circuit 128 in which a diagnosis flag provided from the diagnosis circuit 130 is set. The diagnosis circuit 130 executes various types of diagnoses such as an overcharge diagnosis and an over-discharge diagnosis, based upon measurement values provided by the IC control circuit 123. The data holding circuit 125, which may be constituted with, for instance, a register circuit, stores the between-terminal voltages corresponding to the individual battery cells BC1~BC6 having been detected in correspondence to the battery cells BC1~BC6 respectively and also holds other detection values at preassigned addresses in a state in which they can be read out whenever necessary.

In the internal circuits of the battery cell controller CC3C, at least two source voltages VCC and VDD (3V) are used. The voltage VCC in the example presented in FIG. 4 represents the total voltage for the battery cell group constituted with the battery cells BC1~BC6 connected in series and the voltage VDD is generated at a constant voltage source 134. The multiplexer 120 and the transmission input circuits 138 and 142 used for signal transmission operate on the high voltage VCC. The analog/digital converter 122A, the IC control circuit 123, the diagnosis circuit 130 and the transmission output circuits 140 and 143 used for signal transmission, on the other hand, operate on the low voltage VDD (3V).

A signal received at the reception terminal LIN1 of the battery cell controller CC3C is input to the transmission input circuit 138, whereas a signal received at the reception terminal FFI is input to the transmission input circuit 142. The transmission input circuit 142 assumes a circuit structure similar to that of the transmission input circuit 138. The transmission input circuit 138 comprises a circuit 231 that receives a signal from another battery cell controller adjacent to the battery cell controller CC3C and a circuit 234 that receives a signal provided from the photocoupler PH 1.

As shown in FIG. 1, the signal provided from the photocoupler PH 1 is input to the reception terminal LIN1 of the highest order battery cell controller CC3A whereas the signal originating from the adjacent battery cell controller is input to the reception terminal LIN1 of either of the other battery cell controllers CC3B and CC3C. Accordingly, a switcher 233 selects either the circuit 231 or the circuit 234 to be used based upon a control signal applied to a control terminal CT in FIG. 4. The control signal applied to the control terminal CT 1 is input to the control signal detection circuit 160 and the switcher 233 executes switching operation in response to a command issued from the control signal detection circuit 160.

A command signal received at the reception terminal LIN1 is input to the IC control circuit 123 via the transmission input circuit 142. The IC control circuit 123 outputs data or a command signal corresponding to the received command signal to the transmission output circuit 140. The data or the command signal is transmitted from the transmission terminal LIN 2 via the transmission output circuit 140. It is to be noted that the transmission output circuit 143 assumes a structure similar to that of the transmission output circuit 140.

As explained earlier, the signal received at the terminal FFI is used to communicate an error state. A signal indicating an error received via the terminal FFI is input to the transmission output circuit 143 via the transmission input circuit 142 and the OR circuit 288, and is then output from the transmission output circuit 143 via the terminal FFO. In addition, as an error is detected by the diagnosis circuit 130, a signal indicating an error is input to the transmission output circuit 143 from the diagnosis flag holding circuit 128 via the or circuit 288, regardless of the content of the signal received at the terminal FFI and the error signal is then output from the transmission output circuit 143 via the terminal FFO.

As a signal having been transmitted from the adjacent battery cell controller or the photocoupler PH1 is received at the startup input circuit 147, the timer circuit 150 is activated and the voltage VCC is supplied to the constant voltage source 134. As a result, the constant voltage source 134 enters an operating state and outputs the constant voltage VDD. As the constant voltage VDD (3V) is output from the constant voltage source 134, the battery cell controller CC3C in the sleep state shifts into the operating state.

A line connecting with the terminal CV6 is arranged at the constant voltage source 134 and the voltage at the terminal CV6 is used as a bias voltage for the constant voltage source 134. In addition, the battery cell controller CC3C includes built-in ESD countermeasure diodes D1 and D2, disposed between the terminal VCC and the terminal GND in correspondence to all the terminals therein. These diodes D1 and D2 are normally set so as to assume an orientation that does not allow a flow of current.

A disconnection in the lowest-order sensing line SL, however, stops the operation of the constant voltage source 134. Namely, if the lowest-order sensing line SL becomes disconnected, the consumption current in the integrated circuit flows toward the positive pole of the battery cell BC6 from the ground terminal through the diode D2 and the terminal CV6 as indicated by the dotted line arrow in FIG. 4. It has been learned that this flow will bias the voltage at the terminal CV6 to the negative side by an extent corresponding to the voltage drop at the ESD protection diode D2 (by 0.6V~0.7V), which, in turn, disables operation of the constant voltage source 134. The halt in the operation of the constant voltage source 134 stops the operation of the battery cell controller CC3C and thus disables communication. As a result, the battery controller 20, i.e., the higher-order controller, is no longer able to identify the location of the error.

Figure 5:
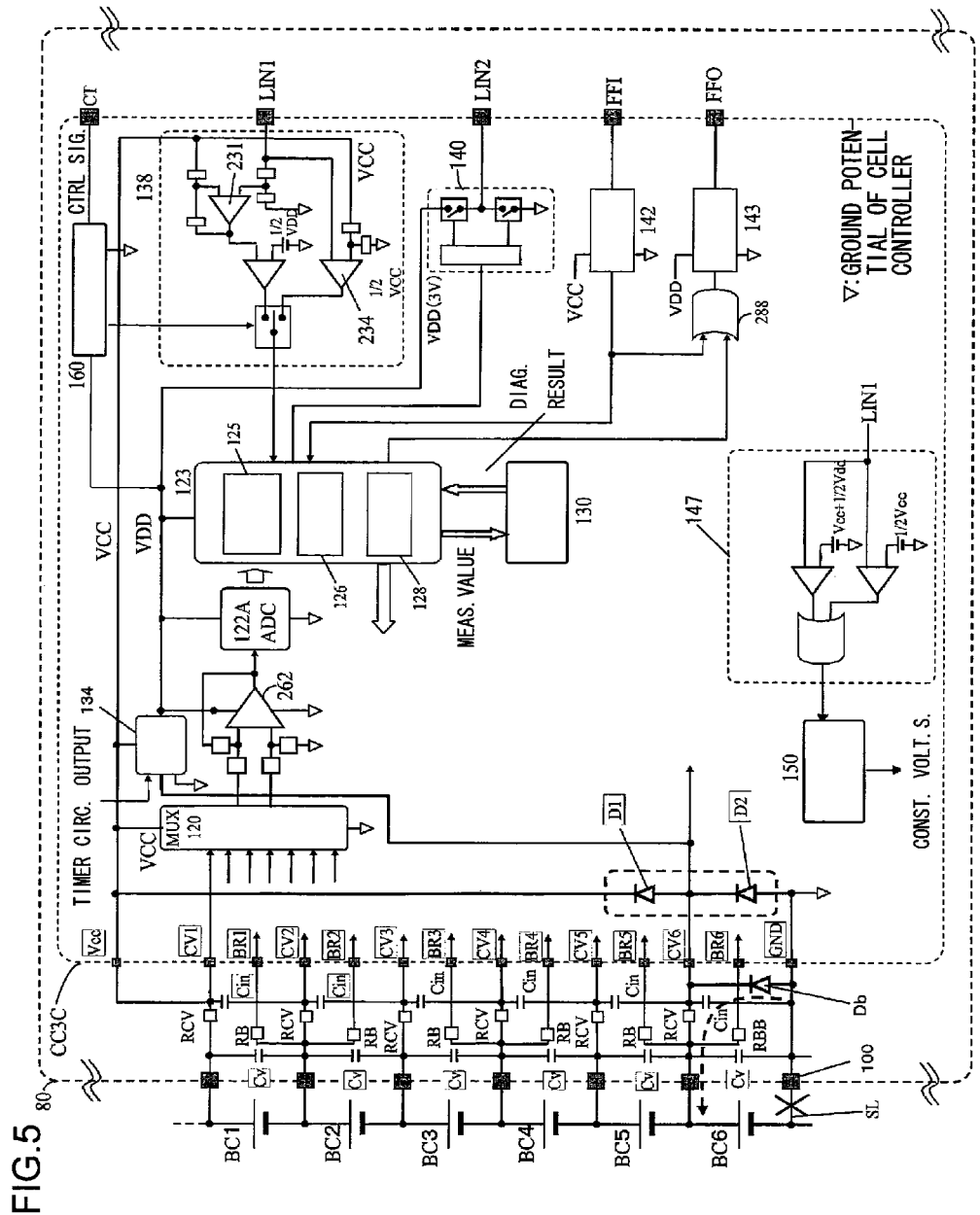
FIG. 5 is a diagram for explaining the measure provided through the second embodiment.

Accordingly, a Schottky diode Db, at which the voltage drop is less than at the ESD protection diode D2, is disposed between the terminal CV6 and the terminal GND in the second embodiment, as shown in FIG. 5. Since the voltage drop at the Schottky diode Db is only approximately 0.3V, the extent to which the voltage at the terminal CV6 is biased to the negative side when the lowest-order sensing line SL is disconnected can be reduced over the related art. As a result, even in the event of a disconnection of the lowest-order sensing line SL, the constant voltage source 130 can remain in the operating state. Since an error is detected with regard to the voltage at the terminal CV6 in the event of a disconnection at the lowest-order sensing line SL, the error location can be determined accurately.

It is to be noted that while the constant voltage source 134 can be sustained in the operating state in the event of a disconnection through the use of the Schottky diode Db, which does not limit the use of a diode to the schottky type diode. For instance, a silicon diode with a large current capacity may be used in place of the Schottky diode Db, since the voltage drop at such a silicon diode is less than at the ESD protection diode D2 when a current of same value is supplied thereto. Namely, while the diode Db provided as a countermeasure against disconnection should manifest a lesser voltage drop compared to the ESD protection diode D2, the exact extent by which the voltage is dropped should be determined in correspondence to the bias voltage with which the constant voltage source 134 is able to remain in the operating state.

Third Embodiment

The third embodiment of the present invention includes the following feature in addition to those in the second embodiment described above. In the second embodiment, which includes the Schottky diode Db, the constant voltage source 134 can be continuously engaged in operation even in the event of a disconnection of the lowest-order sensing line SL. However, if the lowest-order sensing line SL has already been disconnected prior to startup of the battery cell controller CC3C, the battery cell controller CC3C even with the additional structural feature, i.e., the Schottky diode Db, cannot be engaged in operation.

Figure 6:
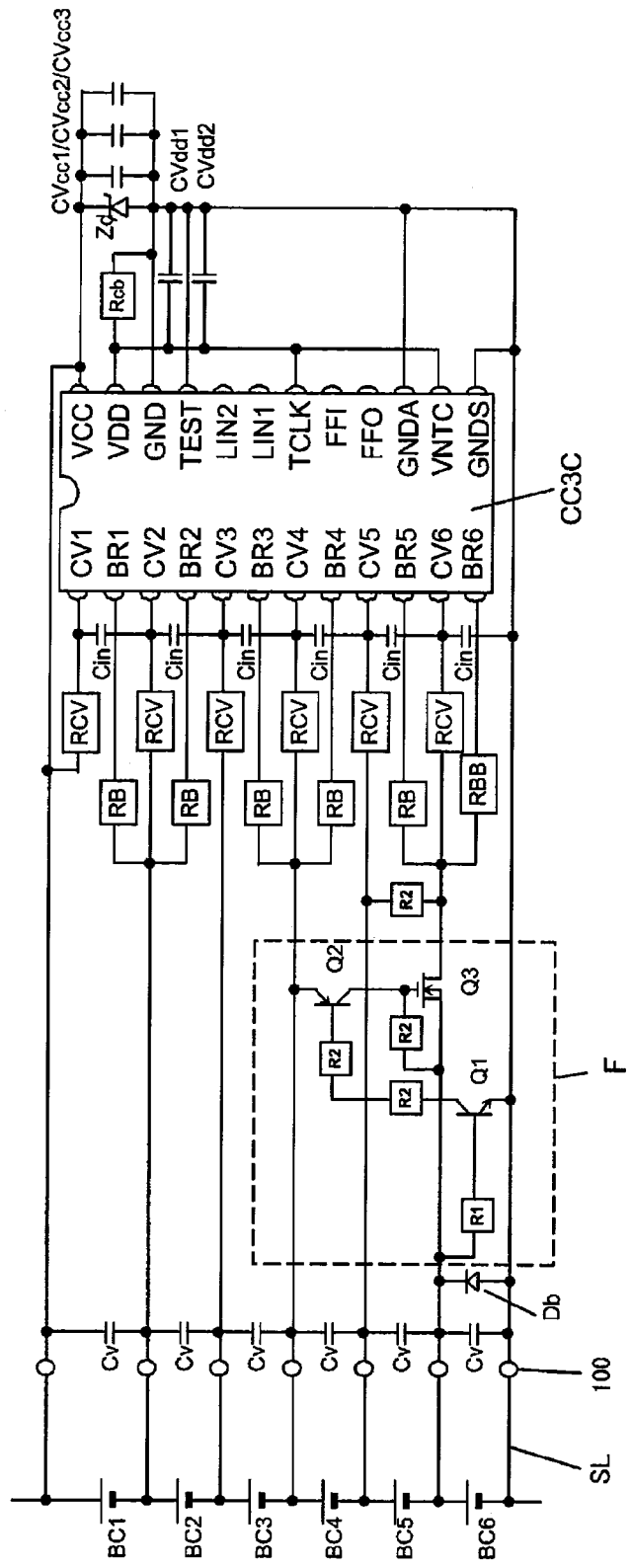
FIG. 6 is a circuit diagram pertaining to a third embodiment of the present invention, which is a variation of the circuit of FIG. 5 and is an another measure.

FIG. 6 is a circuit diagram pertaining to the third embodiment, illustrating a circuit similar to that achieved in the second embodiment, except that it includes an additional structural feature indicated by the dotted line F. It is to be noted that while FIG. 6 shows a battery module with a six-cell configuration, exactly the same principle applies to a four-cell configuration. As long as no disconnection occurs and normal operation is sustained, transistors Q1, Q2 and FETQ3 remain in the ON state and the voltage between the terminal CV6 and the terminal GND is equal to the cell voltage at the battery cell BC6. If the lowest-order sensing line SL becomes disconnected after a startup in the normal operating state, a current flows through the Schottky diode Db, the transistor Q1 is turned off and the transistor Q2 and the FETQ3 are also turned off.

If the cell voltage at the lowest-order battery cell BC6 is lowered to a level at which the voltage value is less than that of the base-emitter voltage Vbe at the transistor Q1, the transistor Q1 is turned off and the transistor Q2 and the FETQ3 are also turned off in sequence. In other words, when the lowest-order sensing line SL is in the disconnected state, the transistors Q1, Q2 and FETQ3 are all turned off and the potential at the terminal CV6 is pulled up by a resistor R2 connected between the terminal CV6 and the terminal CV5. As a result, a positive bias voltage is applied to the constant voltage source 134, thereby enabling a normal startup of the constant voltage source 134. Following the startup, the operating current flows through the Schottky diode Db and thus, the operation can be continuously executed, as has been described in reference to the second embodiment. Following the startup, the transistors Q1, Q2 and FETQ3 all remain in the OFF state.

FIG. 7 presents simulation results with respect to the voltages at various points when normal operation is executed without experiencing a disconnection and the voltages at the various points in the event of a disconnection. FIG. 7 presents simulation results corresponding to cell voltages of 2 V, 3.6 V and 4.5 V. During normal operation, no current flows through the Schottky diode Db and the values of the voltages measured at points between the terminal CV6 and the terminal GND, between the terminals CV5 and CV6 and between the terminals CV4 and CV5, all indicate the cell voltage. In the event of a disconnection, the transistor Q2 will be turned off and the gate-source voltage Vgs at the FETQ3 will be set to 0, thereby turning off the FETQ3, as well. As a result, the voltage measured at a point between the terminal CV6 and the terminal GND will assume a value equal to; "(cell voltage)−(amount of the voltage drop at the diode D2)". In the example described in reference to the third embodiment, an extremely low voltage is measured at a point between the terminals CV5 and CV6, as shown in FIG. 7, and the occurrence of the error can be ascertained based upon this voltage value.

An Embodiment Variation

Figure 8:
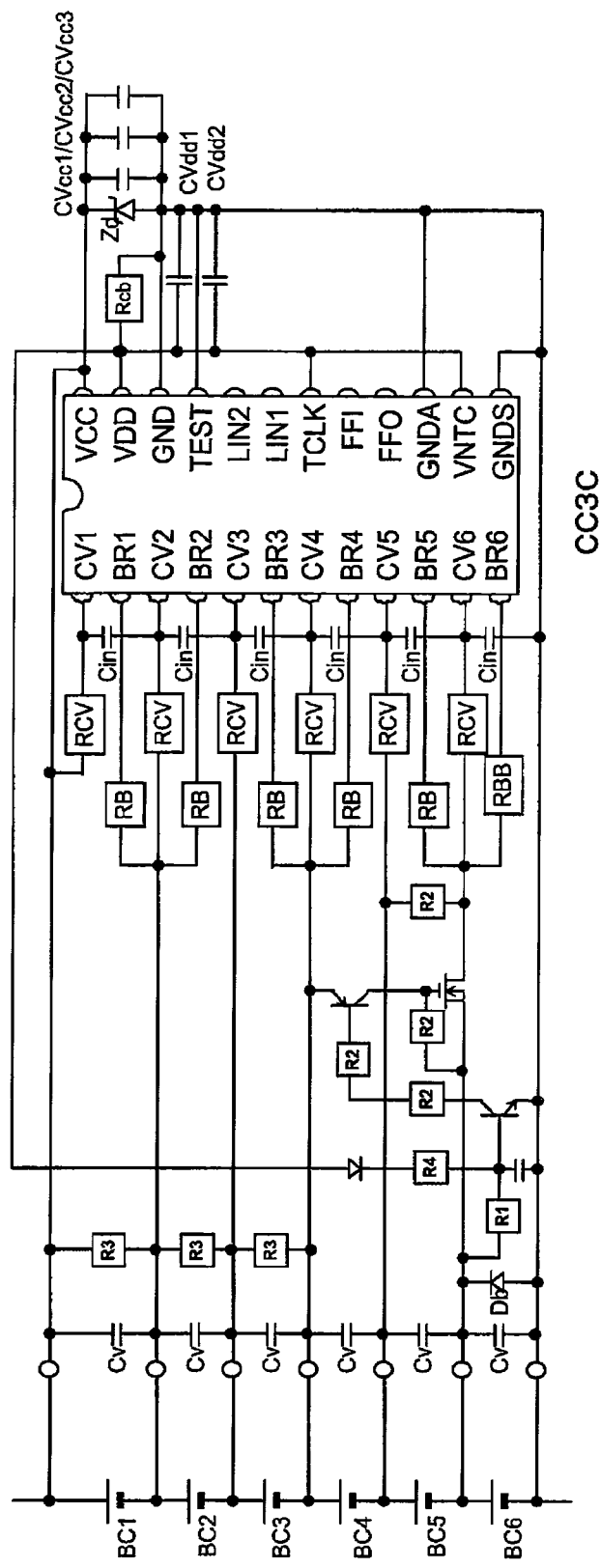
FIG. 8 presents an example of a variation of the measure shown in FIG. 6.
Figure 10A:
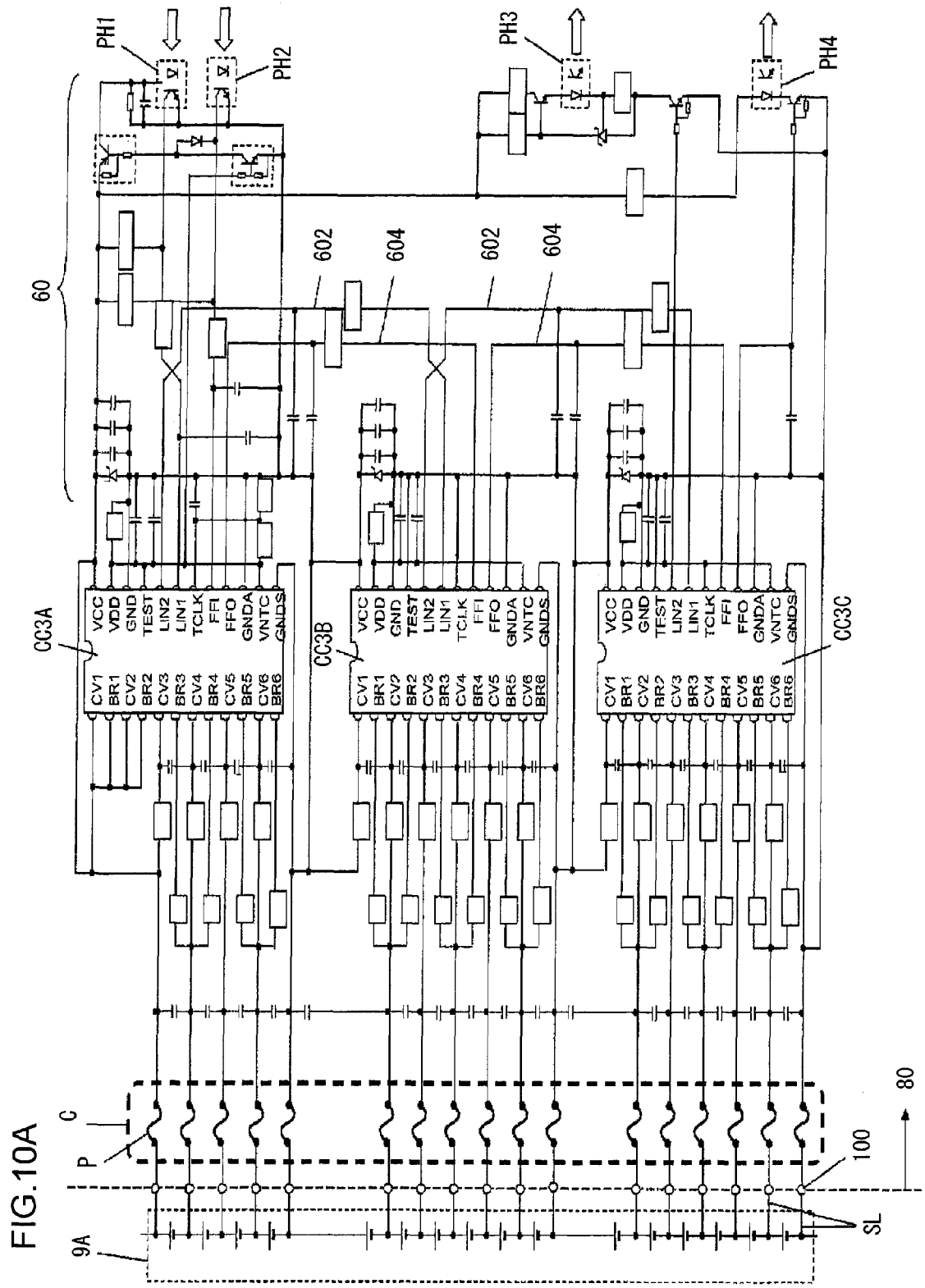
FIG. 10 is a circuit diagram pertaining to a fourth embodiment of the present invention.
Figure 10B:
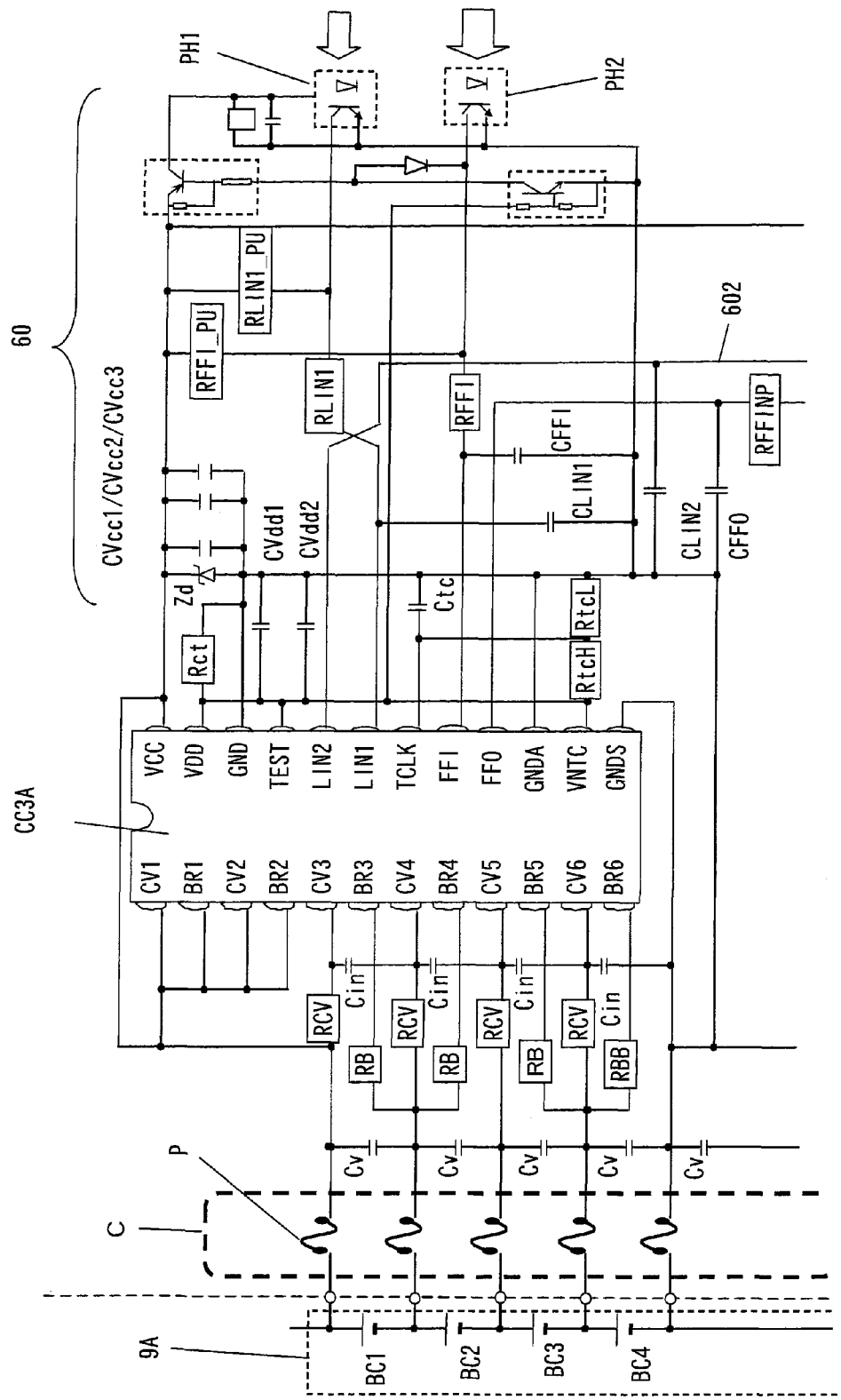
Figure 10C:
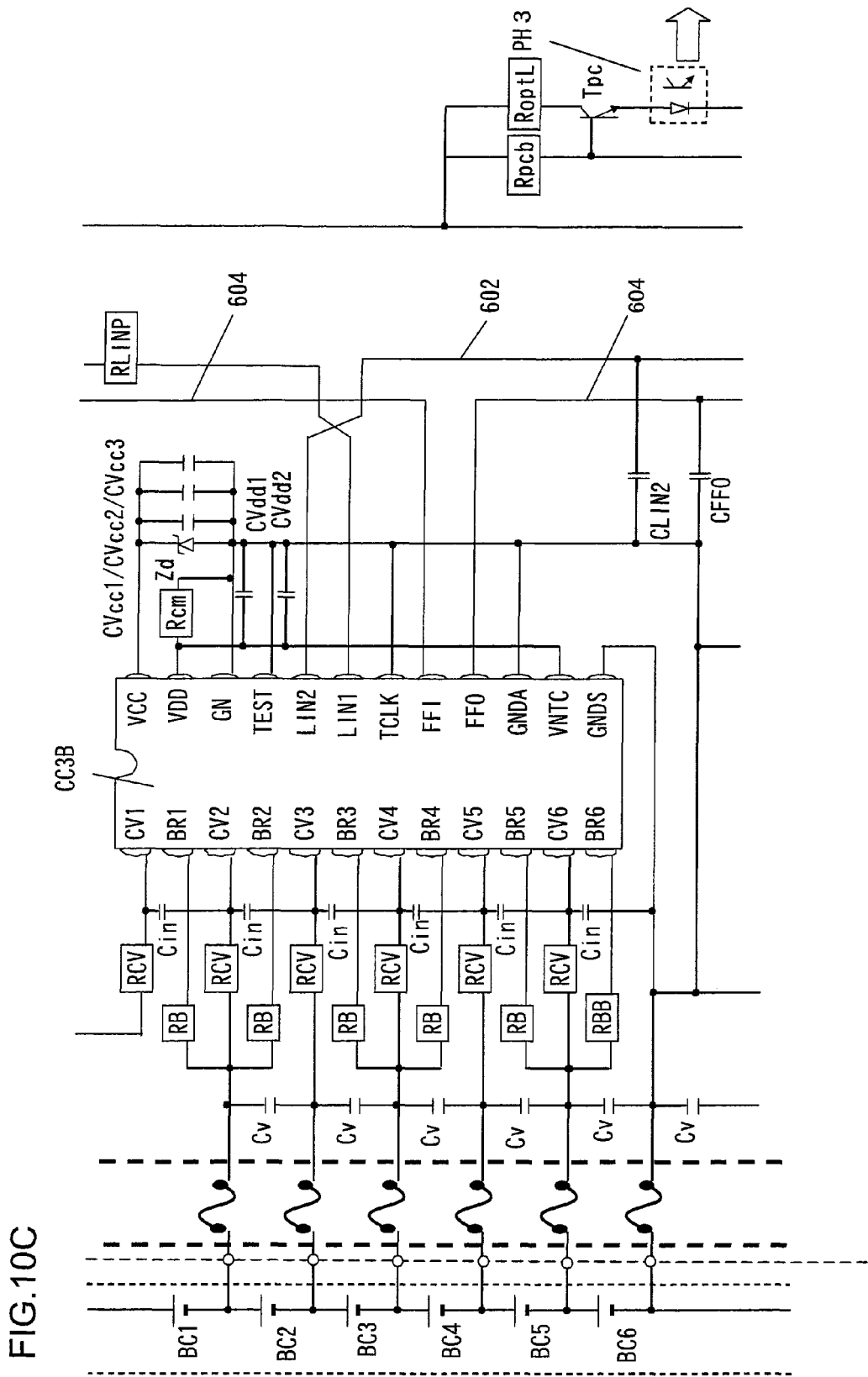
Figure 10D:
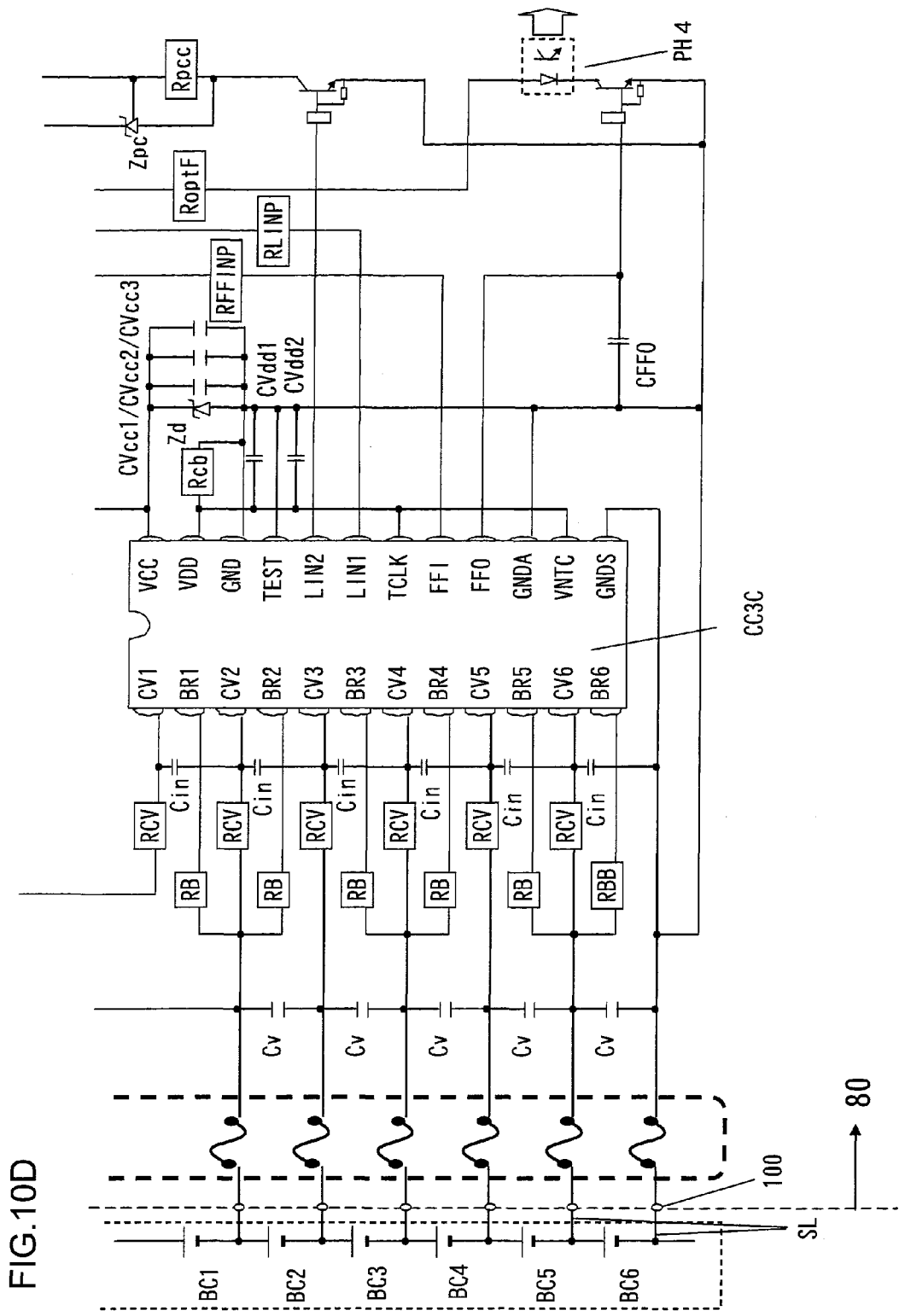

FIG. 8 presents an example of a variation of the measure taken in FIG. 6. The circuit in FIG. 8 is achieved by making the following two modifications to the circuit in FIG. 6. First, a bias voltage is applied to the transistor Q1 by using the internal operating power VDD in the battery cell controller CC3C. By using the stable source voltage VDD for purposes of bias voltage application, it is ensured that the transistor Q2 does not operate erroneously and entered the OFF state due to noise or the like following startup in the normal operating state. If the transistor Q1 is turned off due to noise or the like in a normal operating state, the potential at the terminal CV6 is pulled up, which results in a decrease in the voltage value of the voltage detected between the terminal CV6 and the terminal GND and subsequently, an erroneous voltage detection occurs as indicated in FIG. 7.

Secondly, dark current compensation resistors R3 are installed. The presence of the additional circuit F shown in FIG. 6 results induces a cell dark current (corresponding to the extent of increase in the dark current) as indicated in FIG. 9. FIG. 9 provides cell dark current simulation results indicating that the dark current is at its highest at the battery cell BC5 directly above the lowest-order battery cell BC6. Accordingly, in order to minimize the variance among the dark currents at the individual battery cells, a dark current correction resistor R3 is disposed between the terminals CV1 and CV2, between the terminals CV2 and CV3 and between the terminals CV3 and CV4, so as to adjust the dark currents at individual cells to that at the battery cell BC5 where the dark current assumes the highest level. It is to be noted that in order to match the dark currents at all the battery cells in the battery module, similar dark current compensation resistors R3 must be installed in the higher order battery cell controllers CC3A and CC3B. By installing such dark current compensation resistors R3, the variance among the cell voltages at the individual battery cells can be sufficiently reduced.

Fourth Embodiment

FIG. 10 illustrates the fourth embodiment of the present invention. If shorting occurs between a component (e.g., the terminal capacitor Cv) to which the cell voltage is applied at all times and the substrate pattern in the circuit structure in FIG. 1 described earlier, a large current will flow. In order to prevent any smoke or spark that may occur due to such shorting, the fourth embodiment includes a shorting protection feature indicated by the dotted line C in FIG. 10, located between the input terminals 100 to which the sensing lines SL are connected and the circuit components, so as to provide a protective measure against shorting. In more specific terms, a fine pattern (hereafter referred to as a "fuse pattern") P, which is broken as a large current flows through, is formed as part of the circuit pattern indicated by the dotted line C. The fuse patterns P are formed at the surface layer of the substrate.

Figure 11:
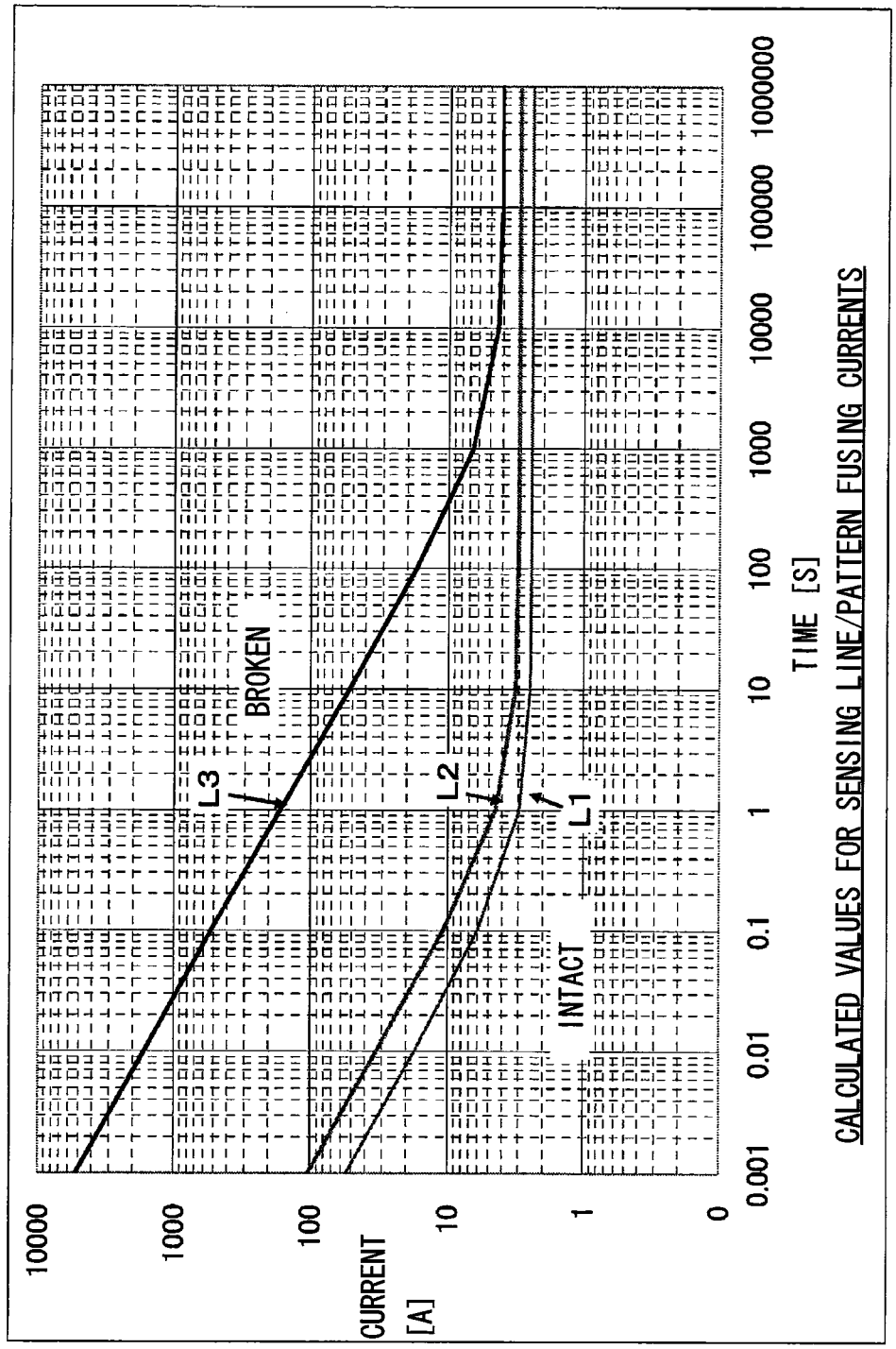
FIG. 11 presents examples of relationships that may be observed between the current value and the length of time elapsing where a fuse pattern P is blown.

FIG. 11 presents examples of relationships that may be observed between the current value and the fusing time by when the fuse pattern P is broken. FIG. 11 shows such relationships (represented by curves L1 and L2) for two different fuse patterns, and a relationship (represented by a curve L3) between the current value and the fusing time pertaining to a sensing line SL. The area above each curve is the range over which the fuse pattern breaks, whereas the area below the curve is the range over which the fuse pattern remains intact. For instance, when the current value is at 10 A, the fuse pattern P corresponding to the curve L1 is broken once the length of time having elapsed exceeds approximately 0.03 seconds. The fusing time for the fuse pattern P corresponding to the curve L2 is approximately 0.1 second, whereas the length of time elapsing before the sensing line SL is broken is approximately 400 seconds. In addition, if the current value is equal to or less than 2 A, no breaking occurrs at any of the fuse patterns and the sensing line corresponding to the curves L1~L3. For instance, assuming that the current value under normal circumstances is equal to or less than 2 A and that the current value exceeds 6 A in the event of shorting or the like, either fuse pattern P will be broken within one second so as to ensure that the sensing line SL and the like are not adversely affected.

Thus, if, for instance, shorting occurs at a terminal capacitor Cv and a current equal to or higher than a specific level flows through such a fuse pattern P formed between the corresponding input terminal 100 and circuit components, the fuse pattern P will be burned as the temperature thereof rises due to joule heat. As a result, the other circuit components are unaffected, and smoking or sparking can be avoided. Since the fuse pattern P is formed at the surface layer, it will be blown off completely as the temperature rises. If, on the other hand, the fuse pattern P was formed at an inner layer of the substrate, the heat at the fuse pattern P would be readily diffused to the surrounding substrate material and, under such circumstances, the substrate might become singed and smoke or fire may occur before the fuse pattern P breaks. However, since the fuse pattern P in the embodiment is formed at the substrate surface layer, it is bound to be burned off completely.

In addition, since the fuse pattern P is formed at the surface layer of the substrate, the mark left by the burnt fuse pattern P will remain on the substrate surface, which makes it easier to identify the location of the disconnection or error. Namely, the fuse pattern P functions as the fuse that breaks when an abnormal current flows through and also functions to indicate the error location as it remains on the substrate as a visible burn mark. The fuse patterns P are formed with lines finer than normal circuit patterns and by adjusting their width and pattern length, a desired resistance value can be set.

Fifth Embodiment

Figure 12A:
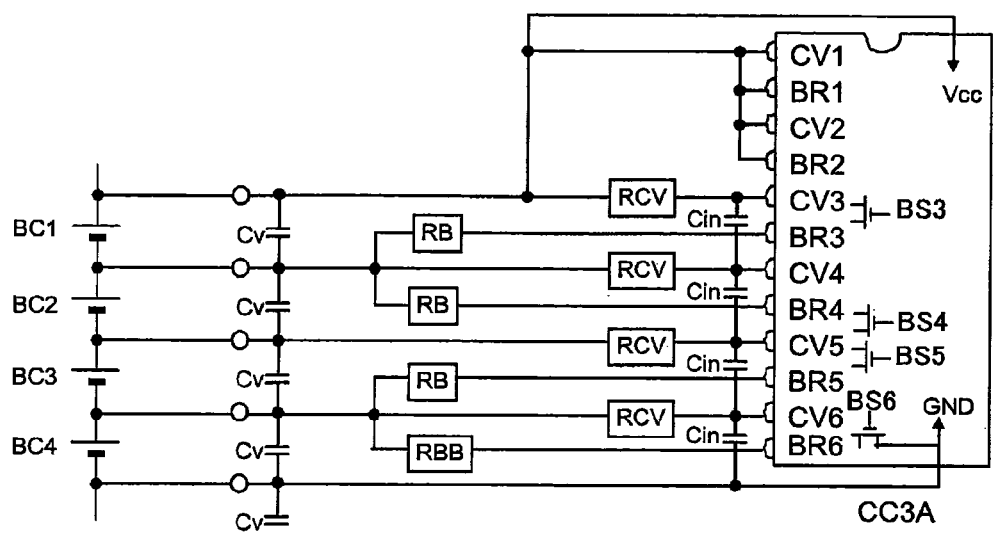
FIG. 12 illustrates a fifth embodiment of the present invention, with FIG. 12A showing a configuration in which the measure provided through the embodiment is not yet implemented and FIG. 12B showing a structure in which the measure is implemented.
Figure 12B:
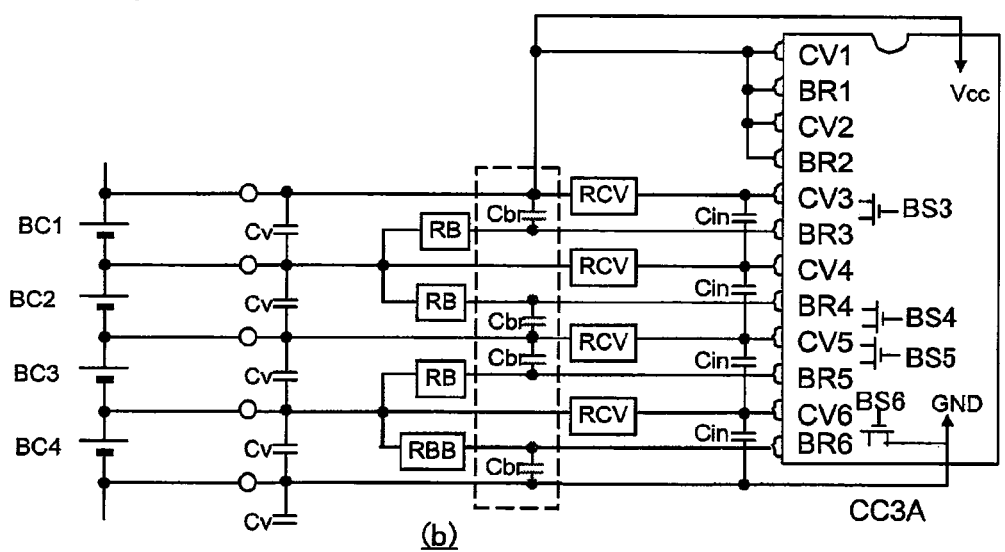

FIG. 12 illustrates the fifth embodiment of the present invention, with FIG. 12A showing a configuration in which the measure provided through the embodiment is not yet implemented and FIG. 12B showing a configuration in which the measure is implemented. Either illustration shows the structure pertaining to the battery cell controller CC3A. The battery cell controllers CC3A~CC3C each include balancing semiconductor switches (hereafter referred to as balancing switches) BS1~BS6, which are used to adjust the charge amount of the battery cells BC1~BC6 constituting the corresponding battery cell group (also referred to as state of charge). It is to be noted that FIG. 12 shows only the balancing switches BS3~BS6 to which four battery cells BC1~BC4 are connected.

The balancing semiconductor switches BS1~BS6 are disposed between the terminals CV1 and BR1 respectively, between the terminals BR2 and CV3, between the terminals CV3 and BR3, between the terminals BR4 and CV5, between the terminals CV5 and BR5 and between the terminals BR6 and GND. In the battery cell controllers CC3B and CC3C, each having six battery cells connected thereat a balancing resistor RB or RBB is disposed at each of the bypass lines extending between the terminals BR1~BR6 and the input terminal 100, as shown in FIG. 1. In the case of the battery cell controller CC3A with four battery cells connected thereat, on the other hand, a balancing resistor RB or RBB is disposed at each of the bypass lines connected to the terminals BR 3~BR 6. For instance, the amount of charge at the battery cell BC6 is adjusted by turning on the balancing switch BS6 disposed between the terminal BR 6 in FIG. 12A and the terminal GND and thus flowing a discharge current via the balancing resistor RBB.

Although not shown, a comparator used to ascertain whether or not a balancing switch is operating normally is connected between the corresponding terminals BR and CV in the battery cell controller CC3A so as to detect whether or not an error has occurred at the particular balancing switch (see, for instance, Japanese Laid Open Patent Publication No. 2007-85847). However, if noise originating from the inverter, for instance, enters the comparator, the voltage attributable to the noise is superimposed to cause erroneous operation of the comparator. In the embodiment, a noise protection capacitor Cbr is disposed at a position between each pair of terminals Cv and BR within the dotted line frame in FIG. 12B. As a result, with the RC filter effect achieved with the capacitors Cbr and resistors RCV, entry of noise into the comparators can be inhibited effectively and thus erroneous operation of the comparators can be prevented.

The embodiment is characterized in that the capacitors Cbr are disposed at the positions indicated in FIG. 12B. If suppression of noise is the sole object, the desired effect can be achieved by disposing the capacitors Cbr at the positions indicated in FIG. 13A. However, such a positional arrangement is bound to cause the following problem. In the battery cell controller CC3A in the embodiment, the cell voltages are measured (over intervals of, for instance, 1 msec) with the analog/digital converter 122A shown in FIG. 4 during the balancing operation by switching the balancing switches in the ON state to the OFF state, since the balancing current path passes through the resistors RCV and thus, accurate cell voltage measurement will not be achieved due to the voltage drop unless the balancing switches are turned off.

Figure 13A:
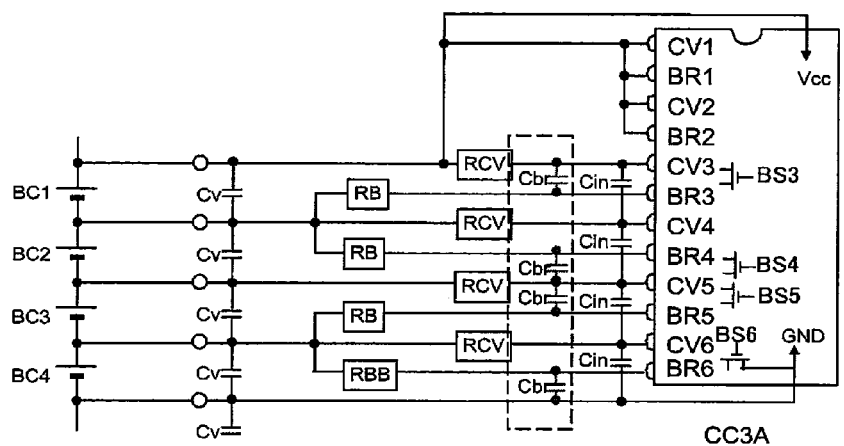
FIG. 13 illustrates the advantages of the fifth embodiment of the present invention, with FIG. 13A showing a circuit provided for purposes of comparison and FIG. 13B showing the waveform of the voltage at the terminal CV measured when the balancing switch in the ON state is turned off.

However, if the capacitors Cbr were disposed at the positions indicated in FIG. 13A, the voltages at the terminals CV would not rise instantly as the balancing switches in the ON state shifted into the OFF state during the cell voltage measurement. Instead, it has been learned that the voltages rise slowly as indicated by the curve L10 in FIG. 13B. When measuring the cell voltages by turning off the balancing switches, the measurement is executed by the analog/digital converter 122A while the voltages rise, and thus, accurate cell voltage measurement cannot be assured.

Figure 13B:
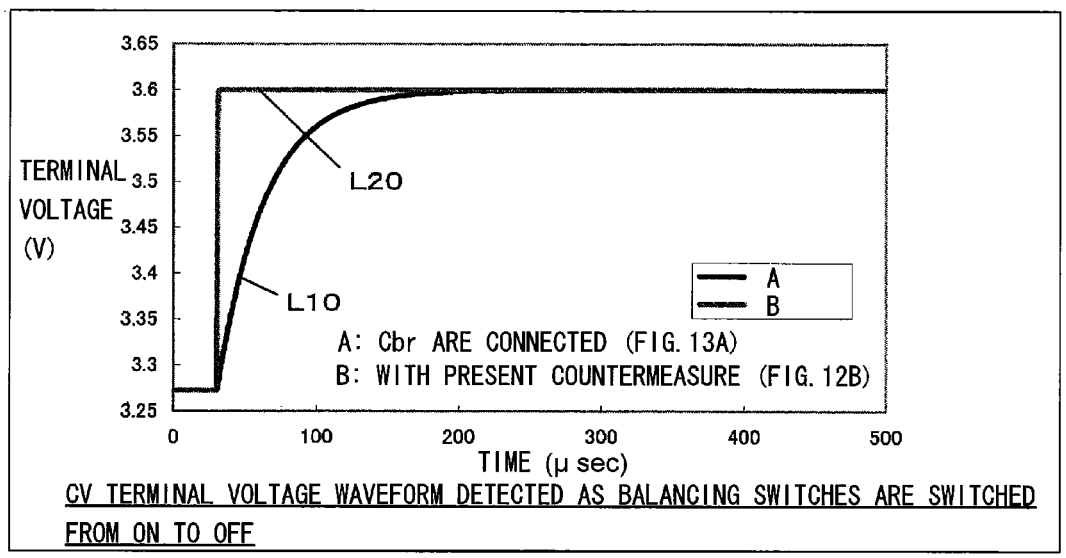
Figure 14A:
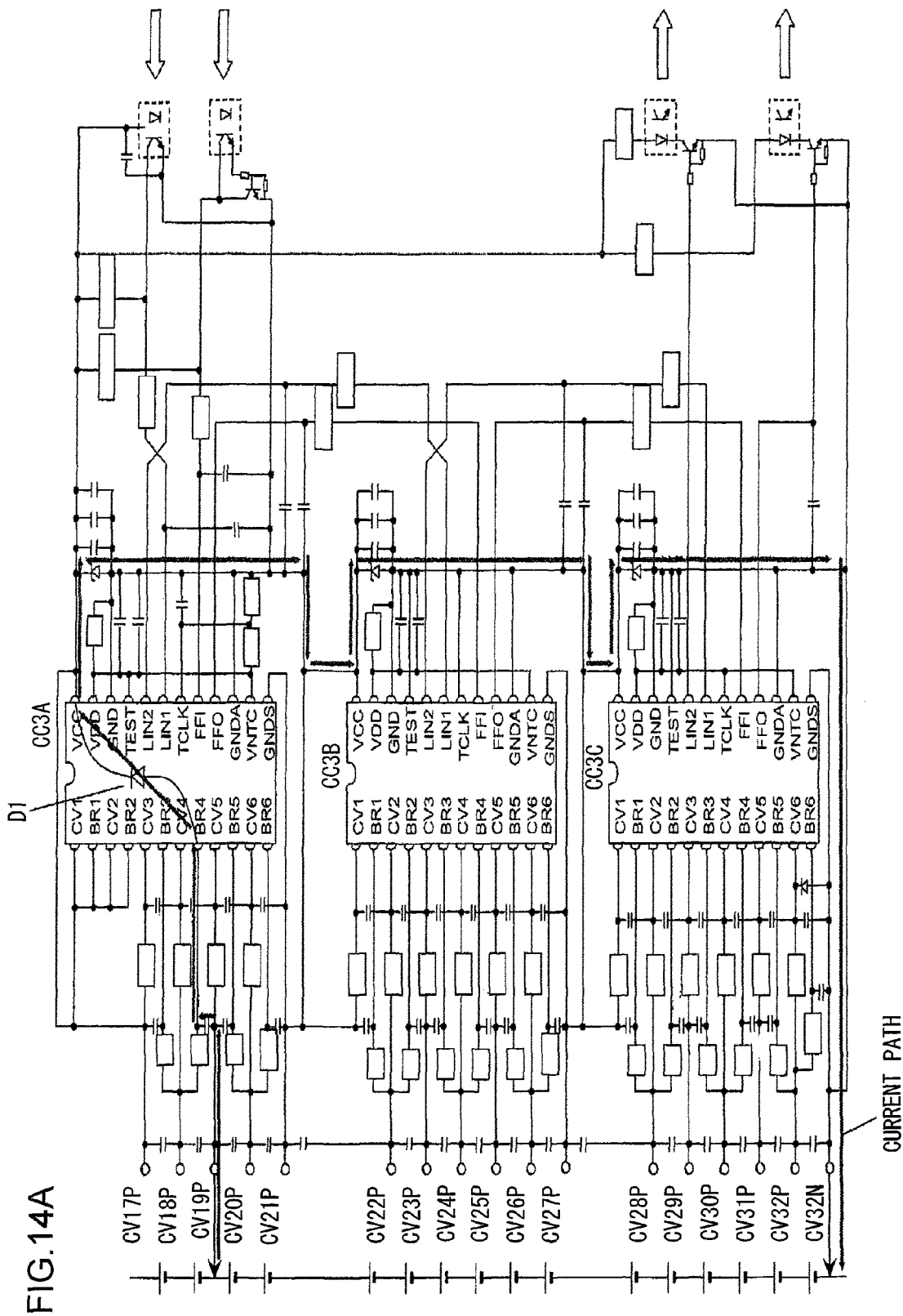
FIG. 14 illustrates a problem that may exist before the measure provided through a sixth embodiment is implemented.
Figure 14B:
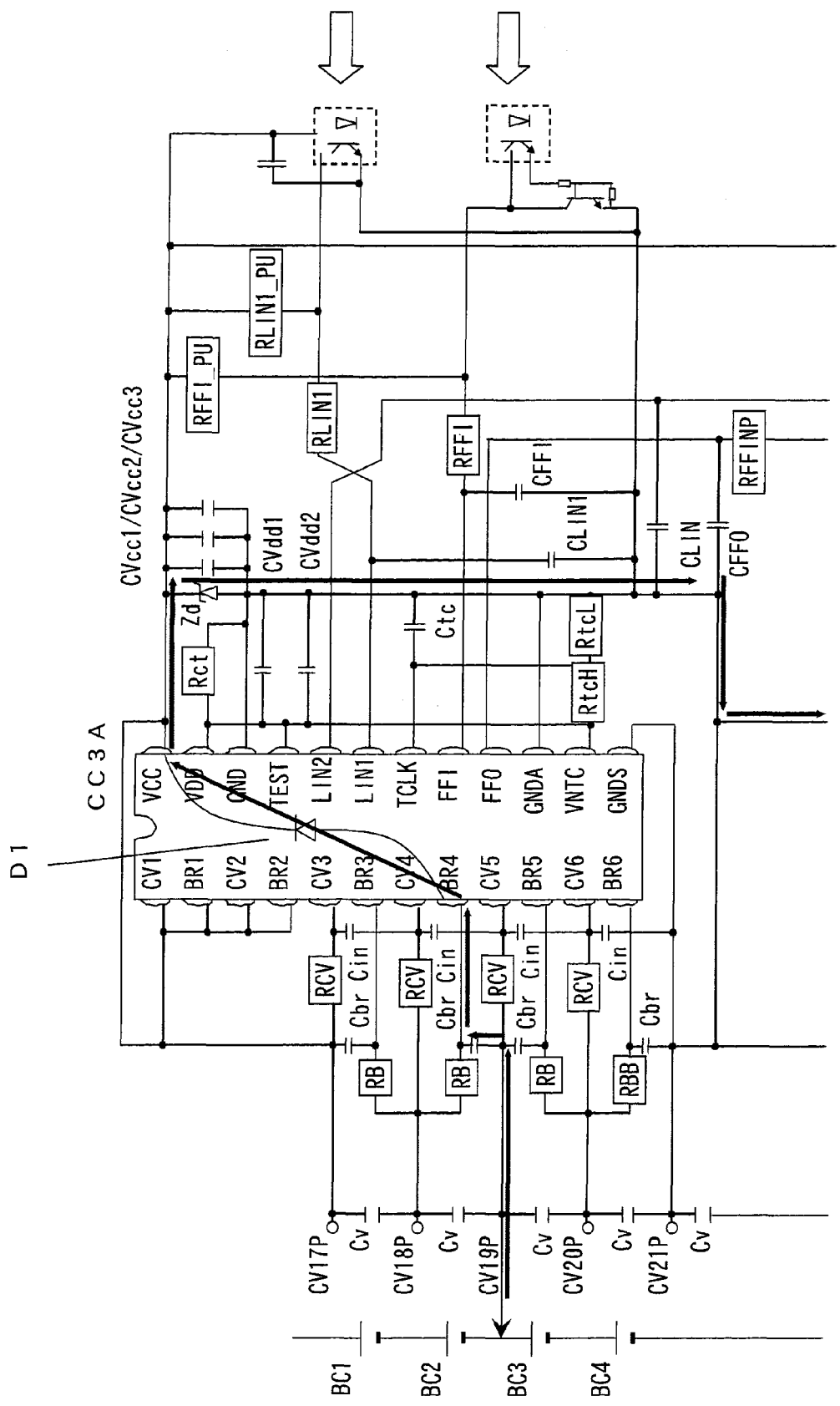
Figure 14C:
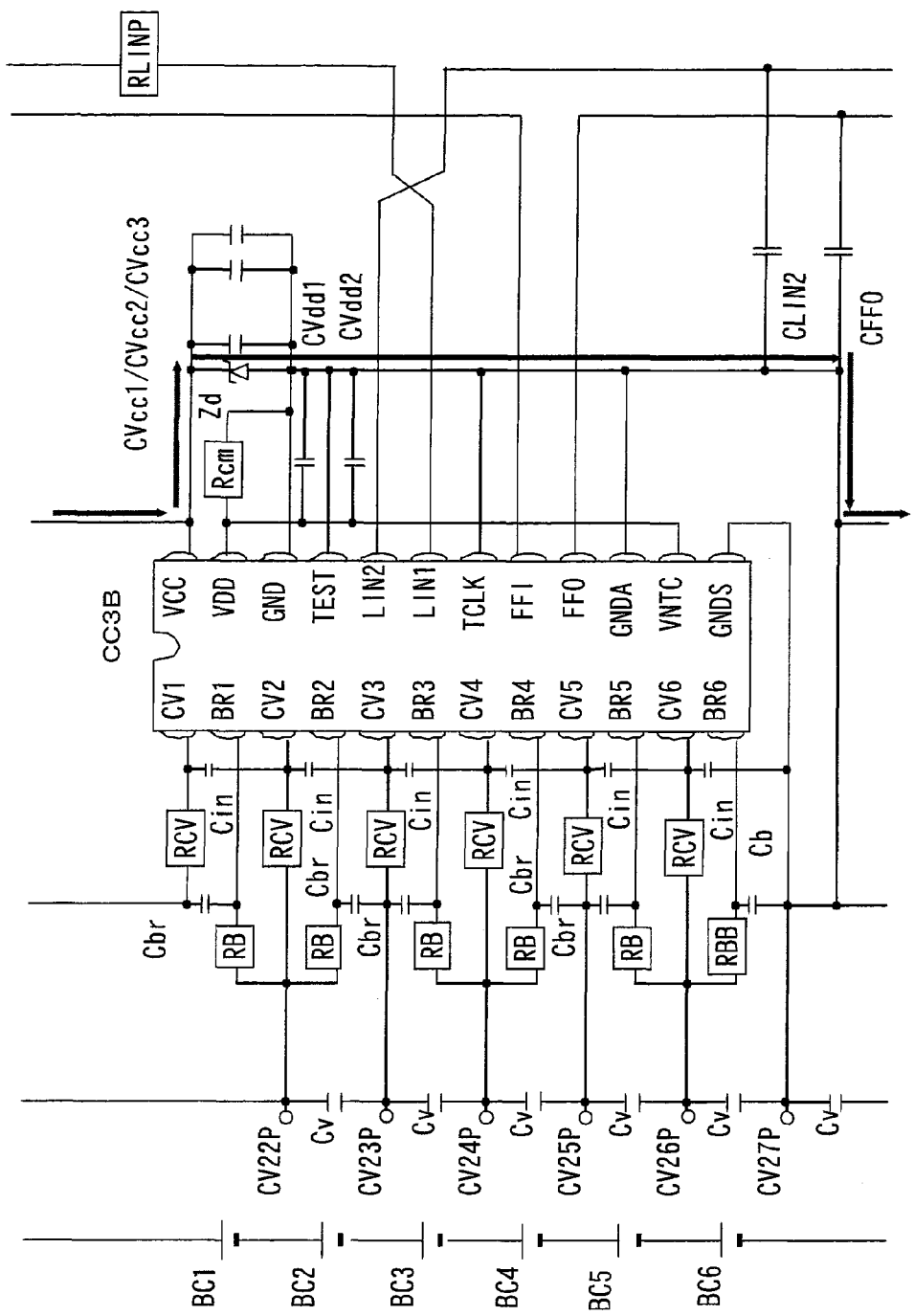
Figure 14D:
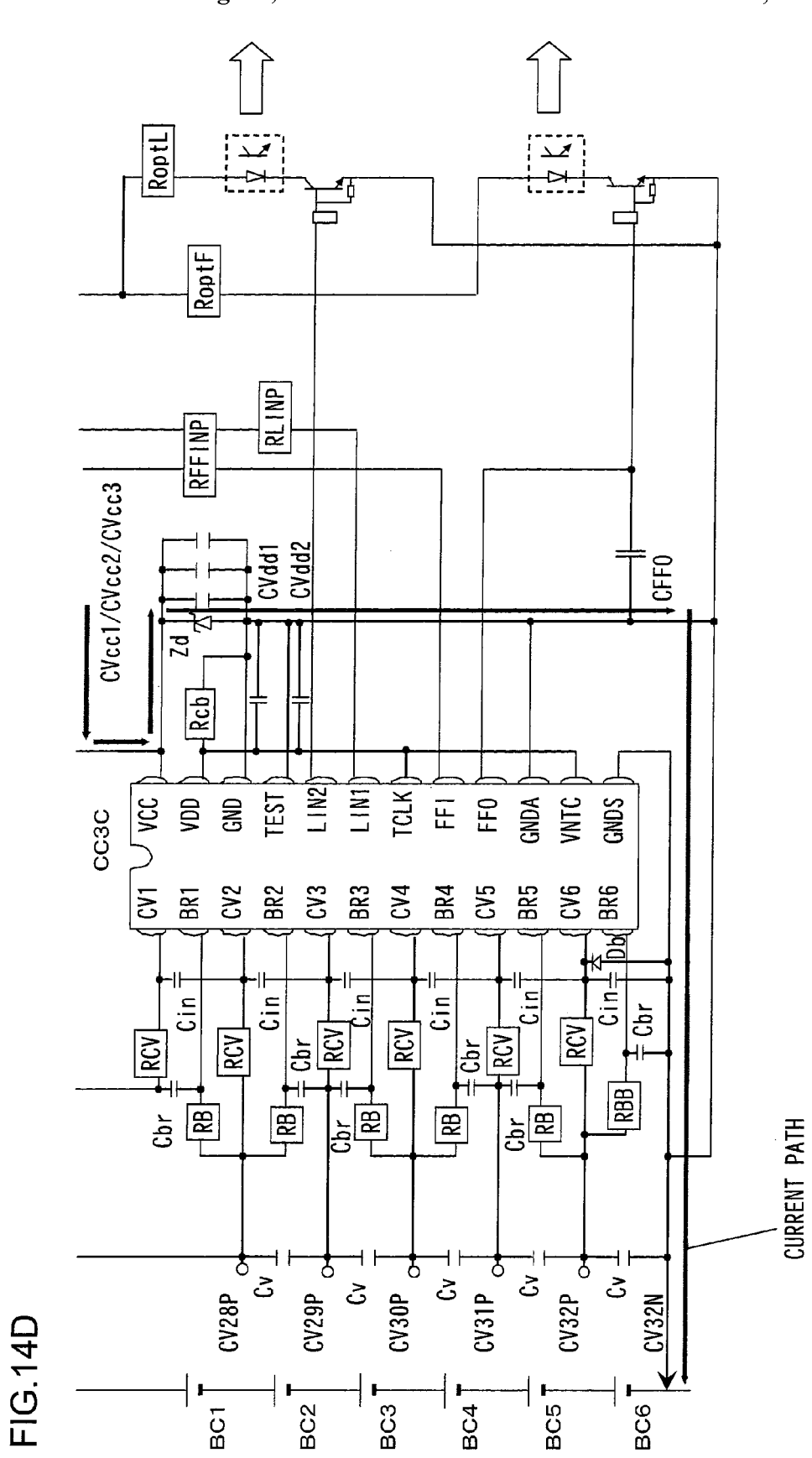

However, as the balancing switches in the structure shown in FIG. 12B are switched from the ON state to the OFF state, the voltages will rise instantly, as indicated by the curve L20 in FIG. 13B. As a result, the cell voltages can be measured accurately without experiencing the problem described above.

Sixth Embodiment

In the fifth embodiment of the present invention described above, the additional capacitors Cbr are disposed as shown in FIG. 12B so as to eliminate any adverse effect of noise on the comparators and assure accuracy of the cell voltage measurement executed by interrupting the balancing operation. However, there is an issue yet to be addressed in that the presence of the capacitors Cbr induces a transient current when the battery module is connected to the cell controller, which may cause a malfunction of the battery cell controller.

FIG. 14 illustrates the problem described above. It is to be noted that in FIG. 14, the input terminals 100 in FIG. 1 are indicated with reference numerals CV17P, CV18P, . . . , CV32P and CV32N assigned in sequence starting with the highest-order input terminal. While the pins at the input terminals may achieve contact in varying orders as the connector between the cell controller 80 and the battery module is connected depending upon the connection condition, it has been learned that an excessively large transient current flows to the terminal BR4 when the input terminal CV32N and the input terminal CV19P are connected first.

As these two terminals CV32N and CV19P are connected, the transient currents will flow as indicated by the straight-line arrows in FIG. 14, i.e., in the order of input terminal CV19P→capacitor Cbr→terminal BR4→ESD countermeasure diode D1→terminal VCC→capacitor CVcc1~CVcc3→input terminal CV32N. Since no resistor is present on this line, a large transient current will momentarily flow through the ESD protection diode D1 installed within the battery cell controller CC3A, destroying the ESD protection diode D1.

Figure 15:
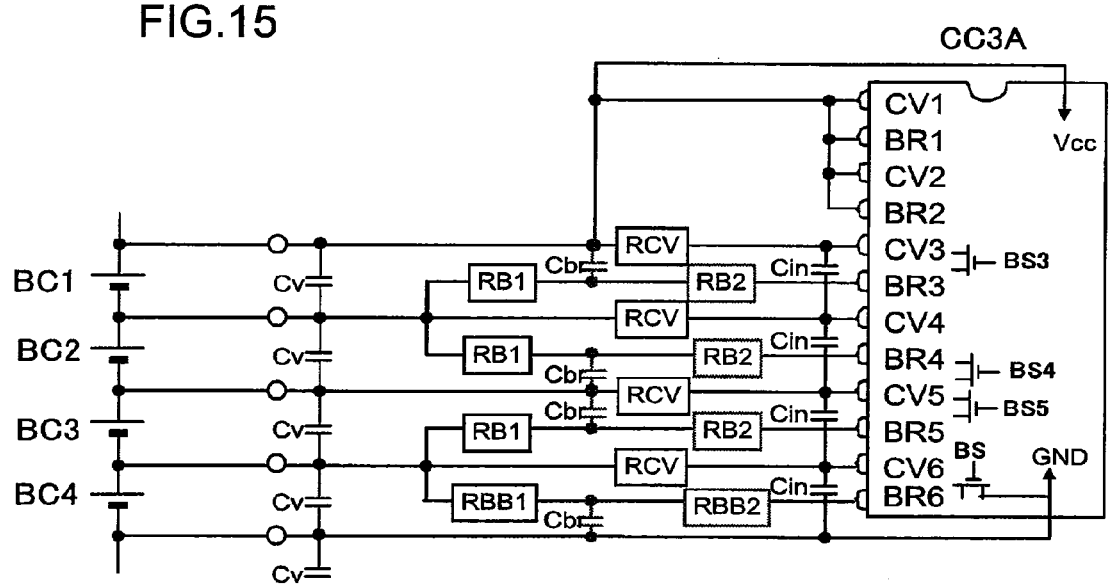
FIG. 15 illustrates the circuit achieved in the sixth embodiment of the present invention, which represents a measure taken for the problem explained with FIG. 14.

FIG. 15 shows a circuit in which a countermeasure against the transient current is implemented for the battery cell controller CC3A. A modified structure is adopted for the balancing resistors in FIG. 15. Other structural features are similar to those of the circuit shown in FIG. 14. While a resistor RB or a resistor RBB is used as a balancing resistor in FIG. 14, the structure shown in FIG. 15 includes balancing resistors RB1 and RB2 replacing each balancing resistor RB, balancing resistors RBB1 and RBB2 replacing the balancing resistor RBB and capacitors Cbr disposed between the balancing resistors RB1 and RB2 and between the balancing resistors RBB1 and RBB2. The other battery cell controllers CC3B and CC3D adopt a similar structure.

The resistance values at the balancing resistors RB1, RB2, RBB1 and RBB2 are set so as to satisfy; RB=RB1+RB2 and RBB=RBB1+RBB2. For instance, assuming that the resistance value at the resistors RB is 300Ω, the resistance values for RB1 and RB2 may be respectively set to 270Ω and 30Ω.

By forming each balancing resistor as a two-part resistor as described above and disposing the balancing resistors RB2 and RBB2 each constituting one part of a balancing resistor between the capacitors Cbr and the terminals BR1~BR6, it is ensured that the terminals BR1~BR6 never become directly connected with the corresponding input terminals through capacitor coupling and that the balancing resistors RB2 and RBB2 are always present between the terminals BR1~BR6 and the input terminals. As a result, since the balancing resistors RB2 are present on the path of the transient current shown in FIG. 14, generation of an excessive transient current is prevented and consequently, destruction of the ESD protection diode D1 is prevented.

It is to be noted that the embodiments described above simply represent examples and that the present invention is not limited in any way whatsoever to the embodiments as long as the features characterizing the present invention remain intact. For instance, while an explanation has been given above on an example in which three battery cell controllers are connected in series, the number of serially connected battery cell controllers is not limited to three and the present invention may be adopted in conjunction with any number N of battery cell controllers connected in series. In addition, the present invention may be adopted in a battery system other than the vehicular battery system described above. Furthermore, the present invention allows any of the embodiments and the variations to be adopted in any combination.

What is claimed is:

1. A battery system, comprising:
   a battery unit formed by electrically connected in series a plurality of cell groups each made up with a plurality of battery cells electrically connected in series;
   a plurality of sensing lines for detecting voltages of respective battery cells in the battery unit;

an integrated circuit provided to each of the cell group, to which the sensing lines for detecting voltages of respective battery cells in the cell group are connected;
a case having housed therein a substrate at which a plurality of integrated circuits provided for the cell groups respectively are mounted;
noise protection capacitors disposed between input terminals of the plurality of sensing lines; and
at least one protection element against static electricity which is connected between the input terminals and the case.

2. A battery system according to claim 1, wherein:
the integrated circuit includes an internal diode disposed between a pair of connector terminals to which a pair of sensing lines for detecting a voltage at a lowest-order battery cell in the battery unit are connected;
a disconnection countermeasure diode is connected outside an integrated circuit between the pair of connector terminals; and
the disconnection countermeasure diode is connected so that an amount of voltage drop as a predetermined current is supplied along a forward direction is less than an amount of voltage drop of the internal diode and that an orientation of forward direction relative to the pair of connector terminals is same as an orientation of the internal diode.

3. A battery system according to claim 2, wherein:
the integrated circuit comprises a constant voltage source to which a voltage at a connector terminal connected to a positive pole-side of the lowest-order battery cell is applied as a bias voltage; and
a pull-up circuit that pulls up a potential at the connector terminal is provided so as to achieve a positive voltage at the connector terminal against ground of the integrated circuit when a lowest-order sensing line among the plurality of sensing lines is disconnected.

4. A battery system according to claim 3, wherein:
dark current adjustment resistors are disposed between the input terminals in order to minimize variance among dark currents of respective battery cells attributable to providing the pull up circuit.

5. A battery system according to claim 1, wherein:
a circuit member that indicates whether or not an abnormal current has flowed through the sensing lines is provided at a surface layer of a substrate upon which the plurality of integrated circuits are mounted so as to assume a position between cell voltage input circuits provided on an input side of the plurality of integrated circuits and the input terminals.

6. A battery system according to claim 5, wherein:
the circuit member constitutes part of a circuit pattern formed at a substrate surface layer between the input terminals and the cell voltage input circuits, and the pattern is broken with a fusing current smaller than a fusing current for the sensing lines.

7. A battery system according to claim 1, further comprising:
bypass lines each provided with a bypass resistor, which connect the input terminals with bypass terminals located at the integrated circuit;
balancing switches provided within the integrated circuit between the bypass terminals and the connector terminals, which adjust variance among charge amounts of the battery cells by supplying a discharge current via the bypass line; and
resistors provided at input lines extending between the input terminals and the connector terminals, wherein:

noise suppression capacitors are connected between input lines located further toward the input terminals relative to the resistors and the bypass lines.

8. A battery system according to claim 7, wherein:
the bypass resistor is split into two resistors, with one of the two resistors provided at a bypass line further toward the input terminals relative to a connecting point at which the noise suppression capacitor is connected and another of the two resistors provided at the bypass line further toward the bypass terminal relative to the connecting point.

9. A battery system, comprising:
a battery unit formed by electrically connected in series a plurality of cell groups each made up with a plurality of battery cells electrically connected in series;
a plurality of sensing lines for detecting voltages of respective battery cells in the battery unit;
an integrated circuit provided to each of the cell group, to which the sensing lines for detecting the voltages of respective battery cells in the cell group are connected;
a case having housed therein a substrate at which a plurality of integrated circuits provided for the cell groups respectively are mounted, wherein:
the integrated circuit includes an internal diode provided between a pair of connector terminals to which a pair of sensing lines for detecting a voltage at a lowest-order battery cell in the battery unit are connected;
a disconnection countermeasure diode is connected outside an integrated circuit between the pair of connector terminals; and
the disconnection countermeasure diode is connected so that a voltage drop as a predetermined current is supplied along a forward direction is less than a voltage drop of the internal diode and that an orientation of forward direction relative to the pair of connector terminals is same as an orientation of the internal diode.

10. A battery system according to claim 9, wherein:
the integrated circuit comprises a constant voltage source to which a voltage at a connector terminal connected to a positive pole-side of the lowest-order battery cell is applied as a bias voltage; and
a pull-up circuit that pulls up a potential at the connector terminal is provided so as to achieve a positive voltage at the connector terminal against ground of the integrated circuit when a lowest-order sensing line among the plurality of sensing lines is disconnected.

11. A battery system, comprising:
a battery unit formed by electrically connected in series a plurality of cell groups each made up with a plurality of battery cells electrically connected in series;
a plurality of sensing lines for detecting voltages of respective battery cells in the battery unit;
an integrated circuit provided to each of the cell group to which the sensing lines for detecting voltages of respective battery cells in the cell group are connected; and
a circuit member that indicates whether or not an abnormal current has flowed through the sensing lines, provided at a surface layer of the substrate upon which the plurality of integrated circuits are mounted so as to assume a position between cell voltage input circuits provided on an input side of the plurality of integrated circuits and the input terminals.

12. A battery system, comprising:
a battery unit formed by electrically connected in series a plurality of cell groups each made up with a plurality of battery cells electrically connected in series;

a plurality of sensing lines for detecting voltages of respective battery cells in the battery unit;
an integrated circuit provided to each of the cell group to which the sensing lines for detecting voltages of respective battery cells in the cell group are connected;
bypass lines each provided with a bypass resistor, which connect the input terminals with bypass terminals provided at the integrated circuit;
balancing switches provided within the integrated circuit between the bypass terminals and the connector terminals, which adjust variance among charge amounts of the battery cells by supplying a discharge current via the bypass line; and
resistors provided at input lines extending between the input terminals and the connector terminals, wherein:
noise suppression capacitors are connected between input lines located further toward the input terminals relative to the resistors and the bypass lines.

13. A battery system according to claim 12, wherein:
the bypass resistor is split into two resistors, with one of the two resistors provided at a bypass line further toward the input terminals relative to a connecting point at which the noise suppression capacitor is connected and another of the two resistors provided at the bypass line further toward the bypass terminal relative to the connecting point.

* * * * *